(12) United States Patent
Rodriguez Suarez et al.

(10) Patent No.: US 11,883,902 B2
(45) Date of Patent: Jan. 30, 2024

(54) FRICTION STIR WELDING USING A PCBN-BASED TOOL

(71) Applicant: Element Six (UK) Limited, Oxfordshire (GB)

(72) Inventors: Teresa Rodriguez Suarez, Oxfordshire (GB); Geoffrey Alan Scarsbrook, Oxfordshire (GB); Maria Louise Cann, Oxfordshire (GB); Josquin Pfaff, Bellach (CH)

(73) Assignee: Element Six (UK) Limited

( * ) Notice: Subject to any disclaimer, the term of this patent is extended or adjusted under 35 U.S.C. 154(b) by 0 days.

(21) Appl. No.: 17/635,911

(22) PCT Filed: Dec. 19, 2020

(86) PCT No.: PCT/EP2020/087346
§ 371 (c)(1),
(2) Date: Feb. 16, 2022

(87) PCT Pub. No.: WO2021/123398
PCT Pub. Date: Jun. 24, 2021

(65) Prior Publication Data
US 2023/0143286 A1 May 11, 2023

(30) Foreign Application Priority Data
Dec. 19, 2019 (GB) ...................... 1918891

(51) Int. Cl.
*B23K 20/00* (2006.01)
*B23K 20/12* (2006.01)

(52) U.S. Cl.
CPC ................ *B23K 20/1255* (2013.01)

(58) Field of Classification Search
CPC .. B23K 20/1255; B23K 20/122; B23K 20/12; B23K 20/129; B23K 2103/16
See application file for complete search history.

(56) References Cited

U.S. PATENT DOCUMENTS

| | | | |
|---|---|---|---|
| 9,016,550 B2* | 4/2015 | Walpole | C23C 4/18 228/2.1 |
| 2005/0035179 A1* | 2/2005 | Forrest | B23K 20/126 228/112.1 |
| 2005/0156010 A1* | 7/2005 | Flak | B23K 20/1255 228/112.1 |

(Continued)

FOREIGN PATENT DOCUMENTS

| | | |
|---|---|---|
| EP | 1345729 B1 | 9/2003 |
| JP | 2003326371 A | 11/2003 |

(Continued)

OTHER PUBLICATIONS

Combined Search and Examination Report issued for GB1918891.1, dated Apr. 2, 2020 (7 pages).

(Continued)

*Primary Examiner* — Erin B Saad
(74) *Attorney, Agent, or Firm* — Armstrong Teasdale LLP

(57) ABSTRACT

The present application relates to a friction stir welding tool insert comprising a polycrystalline cubic boron nitride, PCBN, composite material with a textured surface layer. The textured surface layer comprises a pre-defined repeating pattern.

16 Claims, 12 Drawing Sheets

(56) References Cited

U.S. PATENT DOCUMENTS

| | | | |
|---|---|---|---|
| 2007/0138235 A1* | 6/2007 | Kumagai | B23K 20/24 228/2.1 |
| 2007/0187465 A1 | 8/2007 | Eyre et al. | |
| 2008/0011810 A1* | 1/2008 | Burford | B23K 20/1255 228/2.1 |
| 2008/0217377 A1* | 9/2008 | Stol | B23K 20/1255 228/2.3 |
| 2010/0159265 A1* | 6/2010 | Fairchild | C22C 38/04 219/137 R |
| 2010/0258612 A1* | 10/2010 | Kolbeck | B23K 20/125 228/2.1 |
| 2012/0318848 A1 | 12/2012 | Adachi et al. | |
| 2014/0034710 A1 | 2/2014 | Nelson et al. | |
| 2014/0131426 A1* | 5/2014 | Walpole | B23K 20/125 228/2.1 |
| 2014/0224859 A1* | 8/2014 | Utsumi | C23C 30/00 228/2.1 |
| 2019/0084087 A1 | 3/2019 | Chapman et al. | |
| 2019/0151982 A1 | 5/2019 | Rosal et al. | |
| 2020/0262001 A1 | 8/2020 | Uetani | |

FOREIGN PATENT DOCUMENTS

| | | |
|---|---|---|
| JP | 2008529805 A | 8/2008 |
| JP | 2019042797 A | 3/2019 |
| WO | 2001085385 A1 | 11/2001 |
| WO | 2007086885 A2 | 8/2007 |

OTHER PUBLICATIONS

Combined Search and Examination Report issued for GB2020210.7, dated Jun. 11, 2021 (7 pages).

International Search Report and Written Opinion issued for PCT/EP2020/087346, dated May 7, 2021 (14 pages).

\* cited by examiner

FRICTION STIR WELDING USING A PCBN-BASED TOOL

CROSS-REFERENCE TO RELATED APPLICATIONS

This application is the § 371 national stage of International Application No. PCT/EP2020/087346, filed Dec. 19, 2020, which claims priority to Great Britain Application No. 1918891.1, filed Dec. 19, 2019.

FIELD OF THE INVENTION

This disclosure relates to a composite material comprising tungsten (W), rhenium (Re) and cubic boron nitride (cBN) particles, which are formed together under high pressure and high temperature (HPHT) conditions. The disclosure further relates to the application of the composite material as a probe or tool material for friction stir welding of steels, nickel alloys and other high melting point alloys, and to probes that have much higher performance than existing probes in terms of reduced wear and fracture.

In particular, the disclosure relates to the shaping of the composite material into a probe or tool for friction stir welding using laser ablation.

The disclosure particularly relates to friction sir welding systems in which the shoulder rotates. However, the disclosure also relates to friction sir welding systems in which the shoulder is a static block (translating but not rotating) with a through hole, and the pin extends through the shoulder and rotates.

BACKGROUND

Friction stir welding (FSW) is a technique whereby a rotating tool is brought into forcible contact with two adjacent workpieces to be joined and the rotation of the tool creates frictional and viscous heating of the workpieces. Extensive deformation as mixing occurs along a plastic zone. Upon cooling of the plastic zone, the workpieces are joined along a welding joint. Since the workpiece remains in the solid phase this process is technically a forging process rather than a welding process, none the less by convention, it is referred to as welding or friction stir welding and that convention is followed here.

In the case of FSW in low temperature metals, the whole tool/tool holder can be a single piece of shaped tool steel, in which case it is often referred to as a 'probe'. In the case here where the tool is for welding higher temperature alloys such as steel, the tool is often in two or more parts, with an end element that is in direct contact with the material being welded, often referred to as a 'puck' or 'tool insert', and the remainder of the tool being the 'tool holder' which holds the puck securely and which fits into the FSW machine, so that the tool puck and tool holder together make up the 'tool' or 'tool assembly'. The tool puck is typically shaped to form a shoulder and a stirring pin, often with a reverse spiral cut into the surface so that during rotation it pulls metal towards the pin and pushes this down into the hole being formed by the pin.

In general, FSW operations comprise a number of steps, for example:
a) an insertion step (also known as the plunge step), from the point when the tool comes into contact with the workpieces to the point where the pin is fully embedded up to the shoulder 20 in the heated and softened workpieces,
b) a tool traverse, when the tool moves laterally along the line in between the workpieces to be joined, and
c) an extraction step, when the tool is lifted or traversed out of the workpieces.

The tool traverse, which is the stage primarily forming the weld, is usually performed under constant conditions; typically these conditions are rotational speed, conditions of the plunge, speed of traverse etc.

The FSW method was pioneered by The Welding Institute (TWI) in 1991 and is described in W0 93/10935. TWI have licensed the technology and although it is mostly used to weld together parts made of aluminium (Al) alloys, it is also used for other low melting point metals such as copper (Cu), lead (Pb) and magnesium (Mg).

W0 2004/101205 claims an FSW tool comprising, inter alia, a superabrasive material manufactured under high-pressure high-temperature (HPHT) conditions. Specifically, polycrystalline diamond (PCD) and polycrystalline boron nitride (PCBN) are claimed.

General Electric have filed a patent application (US 2004/238599 A1) directed to using tungsten-based refractory metal alloys for the FSW of steels and other materials.

FSW is a well-established method for joining metals. However, it is currently typically only suitable for metals with a relatively low melting point owing to the requirement that the FSW tool or probe material retains its essential properties at the joining temperature and does not chemically interact with the joined metals. It is for this reason that the joining of steels and other high melting point metals by means of FSW is not feasible using steel probes, such as are used in the case of the lower melting point metals like Al & Cu.

There has been a recent drive to develop an FSW probe using a material that retains its essential properties and form at temperatures above 1000° C. in a ferrous environment, in order to make the FSW joining of steels and other high melting point metals technically and commercially feasible. Suitable tools have been difficult to develop due at least in part to the temperatures but also due to the loads that the tool is subjected to during the process. These tools generally have been found to have a limited life cycle. Moreover, these tools are often fabricated from expensive materials which are difficult to shape, and consequently the tools are costly. Currently, the lifespan of such tools is often measured in terms of metres of welding per tool, and the cost of using the tool measured in terms of $, USD per metre, the tool cost divided by the tool life in metres. Despite knowledge of the many benefits of friction stir welding in steels since the early 2000's or earlier, its use has been very limited since currently available tools are considered expensive, and unreliable and limited in life.

The use of polycrystalline cubic boron nitride (PCBN) made using the HPHT approach, as a probe material, for example, has been described in the art. There has also been substantial research into the use of W, Re, Mo, including their alloys and other refractory metals. Both of these approaches (PCBN & refractory metal) have different disadvantages:

While the PCBN is far more wear resistant than necessary for this application, its fracture toughness is lower than ideally required. The application involves plunging the probe into the work piece(s) at the join between two such pieces, when the work piece is initially cold and the point of contact between work piece and tool relatively small. This step thus involves high forces and rapid heating, and can severely stress and damage the tool. During the subsequent traverse, the tool is also subject to substantial cyclic forces, as the tool is also being rotated, which can drive crack propagation While refractory metals such as W, Mo and Re have sufficient fracture toughness, they lack the wear resistance required for a commercially feasible probe, and their principal failure mechanism is wear. Even more importantly, probes made from such metals tend to distort in form during application.

There is a longstanding need for materials that combine the toughness and strength of W, Mo or Re with the enhanced wear resistance of PCBN, while retaining the substantial chemical inertness and form required during the FSW application.

WO 01/85384 discloses a friction stir welding tool insert comprising PCBN. PCBN is used as a superabrasive coating on a substrate being used for a shoulder with an integral pin. The low coefficient of friction of CBN enables the workpiece material to slide along the tool instead of sticking to it. The low coefficient of friction also leads to reduced tool wear. Solid CBN with no coating is also disclosed but this is said not to have the benefit of a substrate that adds strength and toughness. Pin and shoulders made from separate components are also described.

JP 2019042797 relates to rotary friction welding and discloses use of joining metal with intentional unevenness along a side peripheral surface to increase bonding strength. This is achieved by increasing the side surface of the molten metal and the bonding metal.

There is a further need to develop the physical design of the tool to enhance its performance generally or in specific applications.

In particular, in application there is a desire to increase the wear life of the tool, widen the range of suitable process parameters (rotation rate, traverse or weld speed, etc.), reduce the necessary forces on the tool (for example, to facilitate the use of serial robots to apply the process, or to reduce the forces acting on the pin), and at the same time modify and focus the volume in which heat generation occurs within the workpiece during the welding operation to assist in optimising the other parameters.

SUMMARY OF THE INVENTION

According to the invention, there is provided a friction stir welding tool insert comprising a polycrystalline cubic boron nitride, PCBN, composite material with a textured surface layer, as determined by optical microscopy or scanning electron microscopy, wherein the textured surface layer has a depth of between 0.5 and 50 μm, and wherein the textured surface layer comprises a pre-defined repeating pattern, wherein the pre-defined repeating pattern is defined as the repetitive deviation from the nominal surface that forms the three dimensional topography of the surface and includes roughness (nano- and microroughness), waviness (macroroughness), lay, and flaws.

Preferable and/or optional features of the invention are provided in the dependent claims.

BRIEF DESCRIPTION OF THE DRAWING

The invention will now be more particularly described, by way of example only, with reference to the accompanying drawings, in which.

DETAILED DESCRIPTION OF THE DRAWINGS

Figure 1:
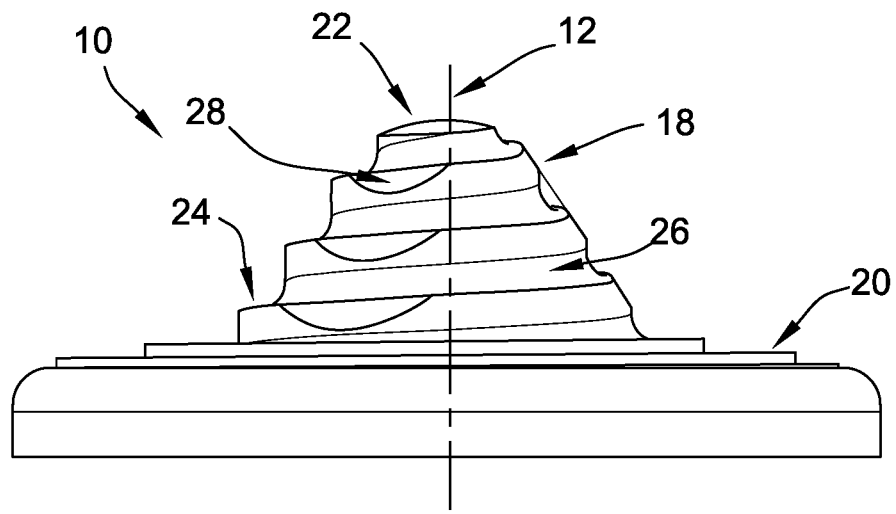
FIG. 1 shows a partial side view of a friction stir welding tool.

The objectives of this disclosure will be better understood once the interaction of the tool and the workpiece has been better described. The shoulder of the tool presses down on the workpiece (the 'axial pressure' of the shoulder), and essentially keeps the plastically softened volume ('the PSV') of metal under substantial pressure, encouraging flow of the material to fill the volume available to it and minimising the risk of voids forming. As the tool is translated laterally, the large void produced by the pin needs filling, and in addition to the axial pressure of the shoulder, this is facilitated by the spiral feature ('reverse spiral') running across the shoulder and down the pin, pushing metal in towards the centre of the tool and down the length of the pin. As such, it would appear that this reverse spiral would benefit from a smooth surface, in order to encourage this movement of material down the spiral. However, the inventors have identified a much more fundamental issue.

There is essentially no direct bonding between the tool and the workpiece, such that the movement of metal in the PSV is actually largely driven by mechanical coupling between the tool and the PSV. The reverse spiral will obviously drive some material movement, but a smooth surface to this spiral also permits some surface slippage between the material of the puck and the PSV. This slippage is disadvantageous: any such slippage at the interface between the PSV and the puck is a cause for wear of the puck, and thus the wear rate of the puck is increased. This process is self-accelerating; wear produces a smoother surface and a less well-defined reverse spiral, the slippage at the interface increases, and the wear rate goes up.

In contrast, by choosing a suitable surface patterning of the puck, the wear from slippage at the interface between the puck and the PSV is substantially reduced or eliminated, and the features on the surface of the puck which are coupling the puck to the PSV thus have a longer life. Essentially, the surface of the PSV in contact with the puck can now be thought of as a viscous boundary layer, with the parallel shear rate at the interface being zero and increasing away from the interface.

Thus, the shear now largely occurs as plastic deformation within the bulk of the PSV, ensuring that more of the mechanical energy of rotation is turned into heat within the PSV, and less is lost by direct frictional heating of the puck. This leads to a second advantage of the improved coupling across the interface from suitable surface patterning, in that the mechanical energy from the tool rotation (and translation) within the material is more directly coupled into the region of interest, that is into the PSV, and generated further away from the puck. This benefit can be taken in a number of different ways, or combinations thereof, as described below, depending on the precise operating conditions chosen.

Firstly, the PSV can run hotter for a given input energy, thus reducing the torque needed to rotate the tool, and reducing the thermal load on the tool and tool holder. The traverse force and the down force onto the tool may also be reduced, consistent with the better softening of the PSV. Alternatively, the operating conditions may be modified to maximise the traverse rate achievable before the weld quality drops by processes such as tearing at the edge of the shoulder. Alternatively the temperature in the PSV can be held at a more conventional value and the rate of rotation reduced.

In consequence, better mechanical coupling between the puck and the PSV of the workpiece can be translated into a number of key benefits, in a manner not previously identified.

In accordance with the invention described in more detail later, this mechanical coupling is best enhanced by shaping the puck by laser, and adapting that process to provide, in addition to the macroscopic features already known in the art such as the reverse spiral, and the microscopic features associated with any surface preparation technique, but also to provide mid-scale features which enhance mechanical coupling between puck and PSV of the workpiece.

Before proceeding, it is also worth reviewing surface characterisation methods. Surface texture is the repetitive or random deviation from the nominal surface that forms the three dimensional topography of the surface. Surface texture is generally accepted to include (1) roughness (nano- and microroughness), (2) waviness (macroroughness), (3) lay, and (4) flaws. The separation of roughness and waviness is one of feature size and frequency analysis, and lay refers to directional or spatially oriented features, and flaws refers to larger distinct features occurring so infrequently to only appear randomly on the scale of the measurement size.

Historically measurement has been by mechanical line profiling, generating Ra type measurements, but now surfaces are generally measured over an area of a few square μm's using optical techniques with values reported as Sa, the arithmetic average of the absolute deviation from the nominal surface within the area.

The typical processing to shape of superhard materials such as sintered PCBN composites is by grinding. This is largely cost and speed driven, and has been developed over an extended period to enable some quite advanced and accurate shaping. The grinding of superhard composites such as PCBN in a binder phase such as W—Re typically gives maximum surface excursion of about half the characteristic PCBN particle size, or slightly smaller if some fraction of this if the particles are being cleaved during grinding, and an Sa typically an order of magnitude lower than this. In this grinding process, CBN particle sizes of 8-20 μm are used, giving typical maximum excursions in the range 4-8 μm and an Sa which is typically around 0.3-1 μm.

Geometry

Figure 2:
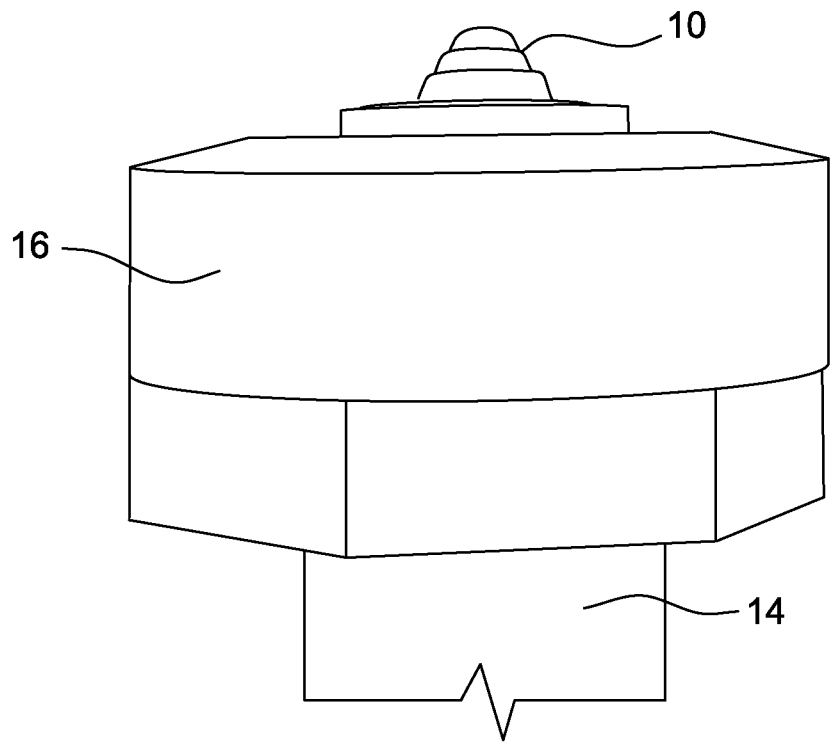
FIG. 2 is a side view of a tool assembly comprising the tool of FIG. 1, a tool holder and a locking collar securing the tool to the tool holder.

Referring to FIGS. 1 and 2, an FSW tool insert is indicated generally at 10. The tool insert 10 has an axis of rotation 12 about which it rotates during FSW. (Note that this axis of rotation is not an axis of rotational symmetry, largely because of the asymmetric thread pattern machined into the tool insert.) In use, the tool insert 10 is shrunk fit into a tool holder 14. A locking collar 16 secures the tool insert 10 in place on the tool holder 14. Note that this is an example of a common type of tool holder, but that the invention is independent of the type of tool holder used.

The tool insert 10 comprises a stirring pin 18, a shoulder 20 and a body portion (not shown), all in axial alignment with each other. The stirring pin 18, shoulder 20 and body portion are all integrally formed with each other.

The stirring pin 18 extends from a rounded apex 22 to the shoulder 20. In this embodiment, the shoulder 20 is substantially cylindrical and has a larger diameter than a circular base of the stirring pin 18. The stirring pin 18 has an inscribed spiral feature running from the apex 22 down to the shoulder 20. As such, the stirring pin 18 is generally conical in profile. The spiral has a planar pathway 24, which faces axially. In use, the rotation of the tool is such that the spiral drives workpiece material flow from the edge of the shoulder 20 to the centre and then down the length of the stirring pin 18, forcing workpiece material to circulate within the stirred zone and to fill the void formed by the pin as the tool traverses. Such circulation is understood to promote homogeneous microstructure in the resulting weld. The working surface 26 of the tool insert 10 faces radially.

Several tri-flats 28 are provided in the spiral. Each tri-flat 28 is an edge chamfer of the planar pathway 24. In this example, three sets of tri-flats 28 are provided, each set having three tri-flats 28, making nine tri-flats 28 in total for this particular tool 10. The sets are spaced apart by approximately 120 degrees about the axis of rotation 12. Within each set, the tri-flats 28 are axially spaced apart on the spiral, i.e. spaced apart along the axis of rotation 12 but still on the spiral.

The shoulder 20 extends axially to meet the body portion. The body portion is configured to couple with the tool holder 14.

Composition

In terms of materials, an example composition of the tool insert material in accordance with the invention is provided in Table 1.

TABLE 1

| CBN (Volume %) | Particle size (μm) | Binder (Volume %) | Composition (Weight %) |
|---|---|---|---|
| 70 | 8-20 | 30 | W/Re/Al 72.5/25.5/2 |

Figure 3:
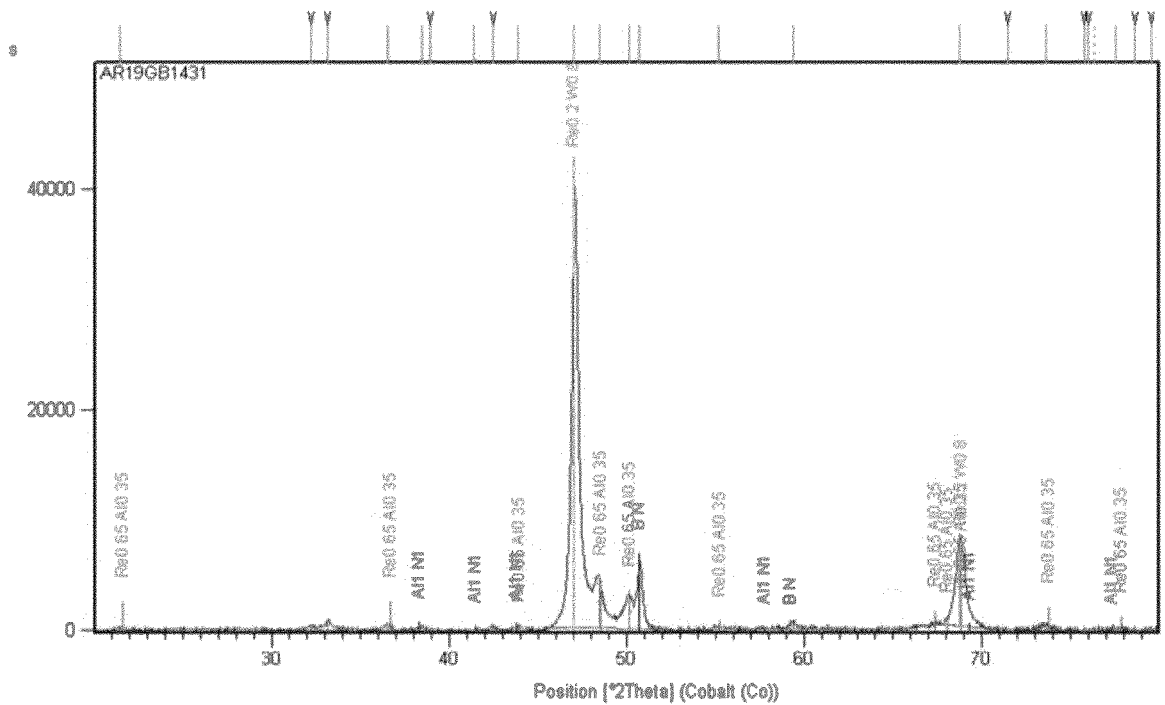
FIG. 3 is an X-ray diffraction trace of tool insert material showing the main phases.
Figure 4:
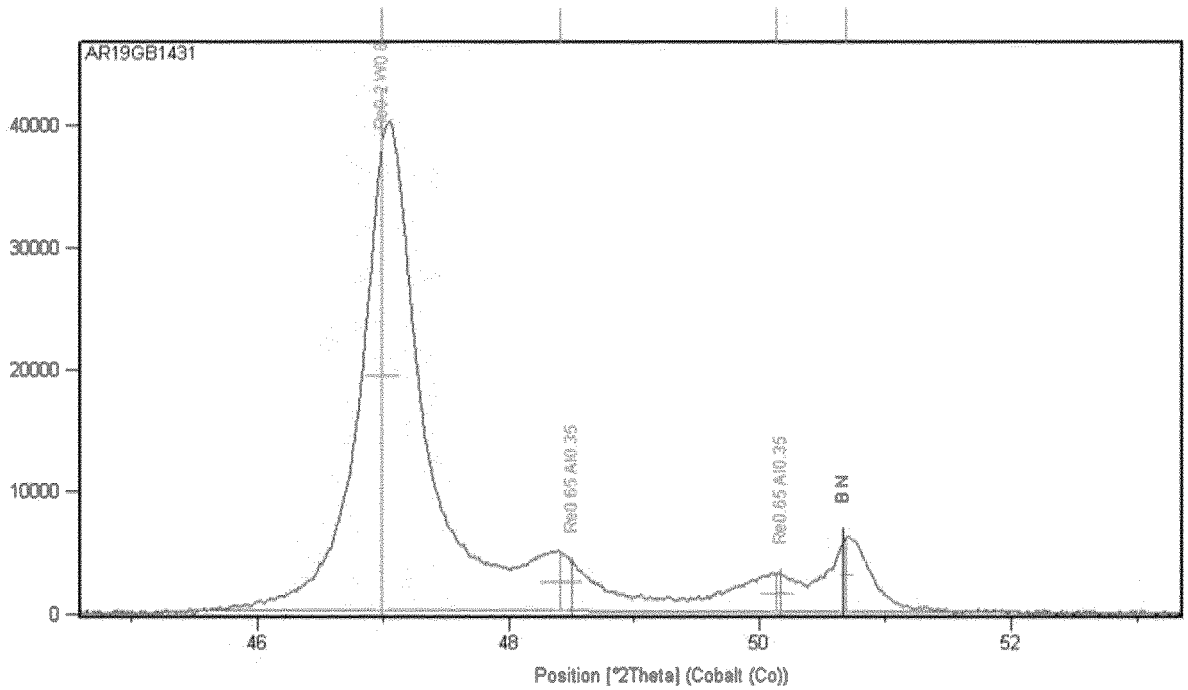
FIG. 4 is an enlargement of the X-ray diffraction trace of FIG. 3.

Using X-Ray Diffraction (XRD), as indicated in FIGS. 3 and 4, the principal phases identified within the composite material were cBN and a W—Re alloy. However, peaks of a Re—Al alloy and AlN were also observed.

Figure 5:
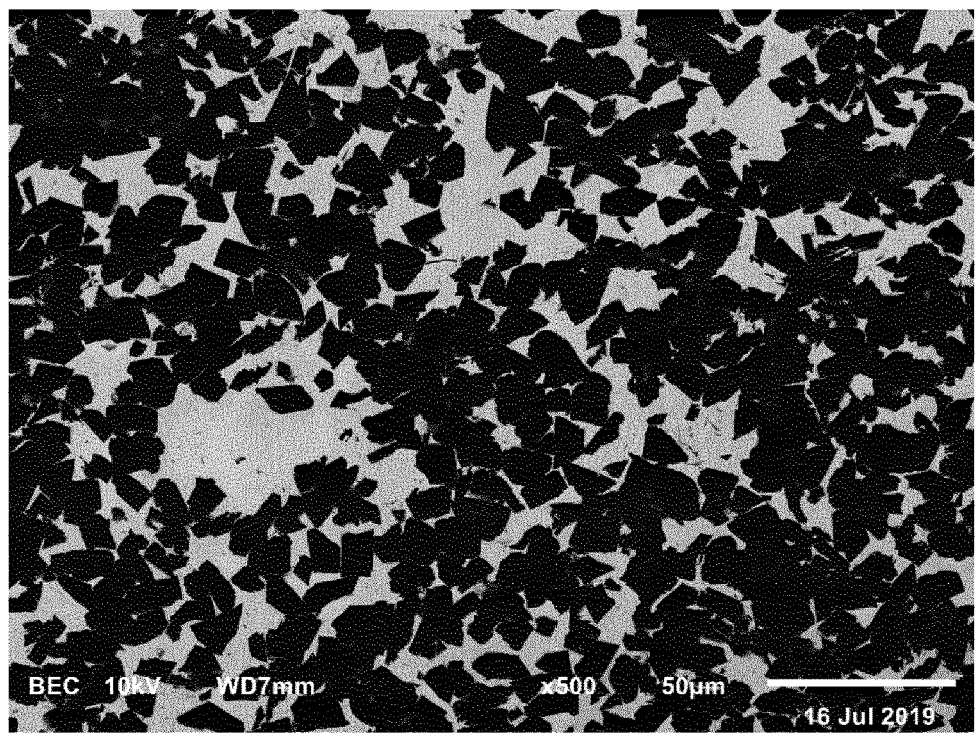
FIG. 5 is a scanning electron microscopy (SEM) micrograph of the tool insert microstructure at a magnification of 500×.
Figure 6:
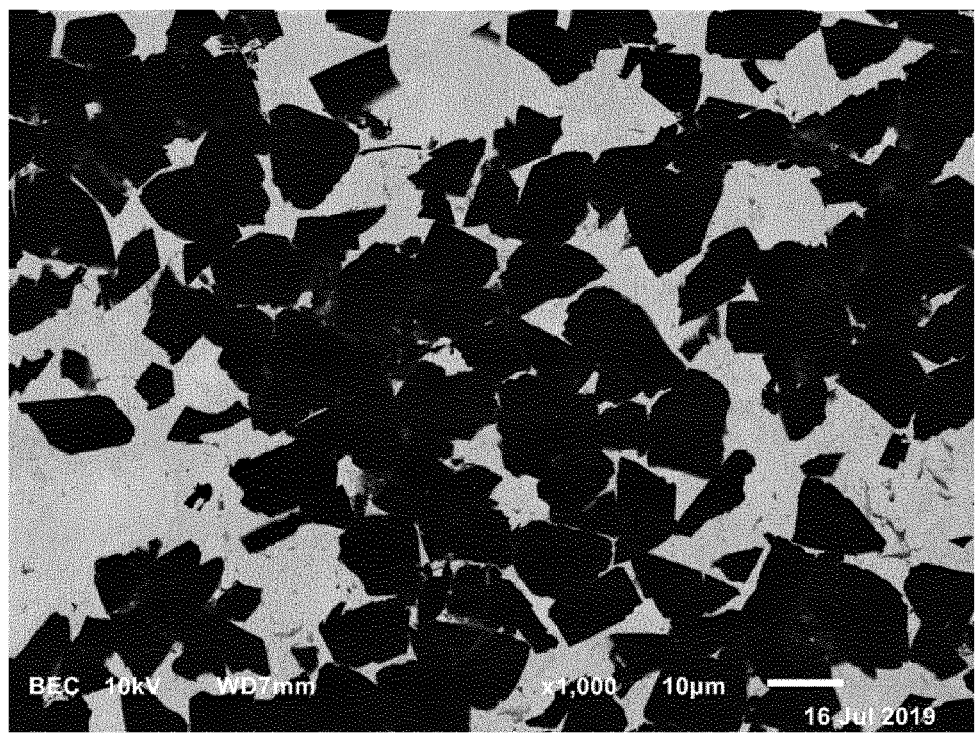
FIG. 6 is an SEM micrograph of the tool insert microstructure at a magnification of 1000×.
Figure 7:
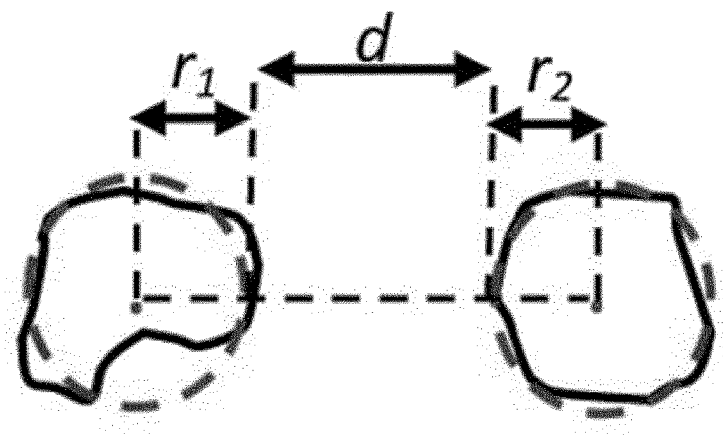
FIG. 7 is a schematic indication of how the distance between similar cBN grains was measured.

The microstructure was captured visually using Scanning Electron Microscopy (SEM)—see FIGS. 5 and 6. The microstructure was subsequently characterised. The grain size, and the distance between cBN grains, termed herein as 'Near Neighbour Distance, d', were measured from SEM micrographs taken at a magnification of 500× and 1000×. The measurement approach is indicated in FIG. 7 and is explained further below.

Near neighbour distance is similar to the expression 'binder mean free path', which is a widely used term in the literature on carbides, measured after the material cools down to room temperature. It is perhaps the single most important parameter characterizing the microstructure of the binder. It is a measure of the thickness of the binder and depends on both the binder composition and the particle sizes. It is nominally based on the average spacing of particles, all of which are assumed to be separated from each other by binder layers, and may take into account the presence of contiguous carbide particles without any binder phase between them (Exner, H. E, Gurland, J., POWDER METALLURGY, 13 (1970) 20-31, "A review of parameters influencing some mechanical properties of tungsten carbide-cobalt alloys").

Images were captured using a JSM 6610 series scanning electron microscope from Jeol™. The sample was placed at a working distance of 7 mm and the accelerating voltage was set to 10 kV. The grain size was measured using ImageJ image analysis software and the 'Watershed' image processing technique.

In brief, the grain size was measured using the following steps:
Make the SEM image binary;
Apply a gridline across the image with a spacing of 10 micron and
Measure the size of the grains along the lines.

Figure 8:
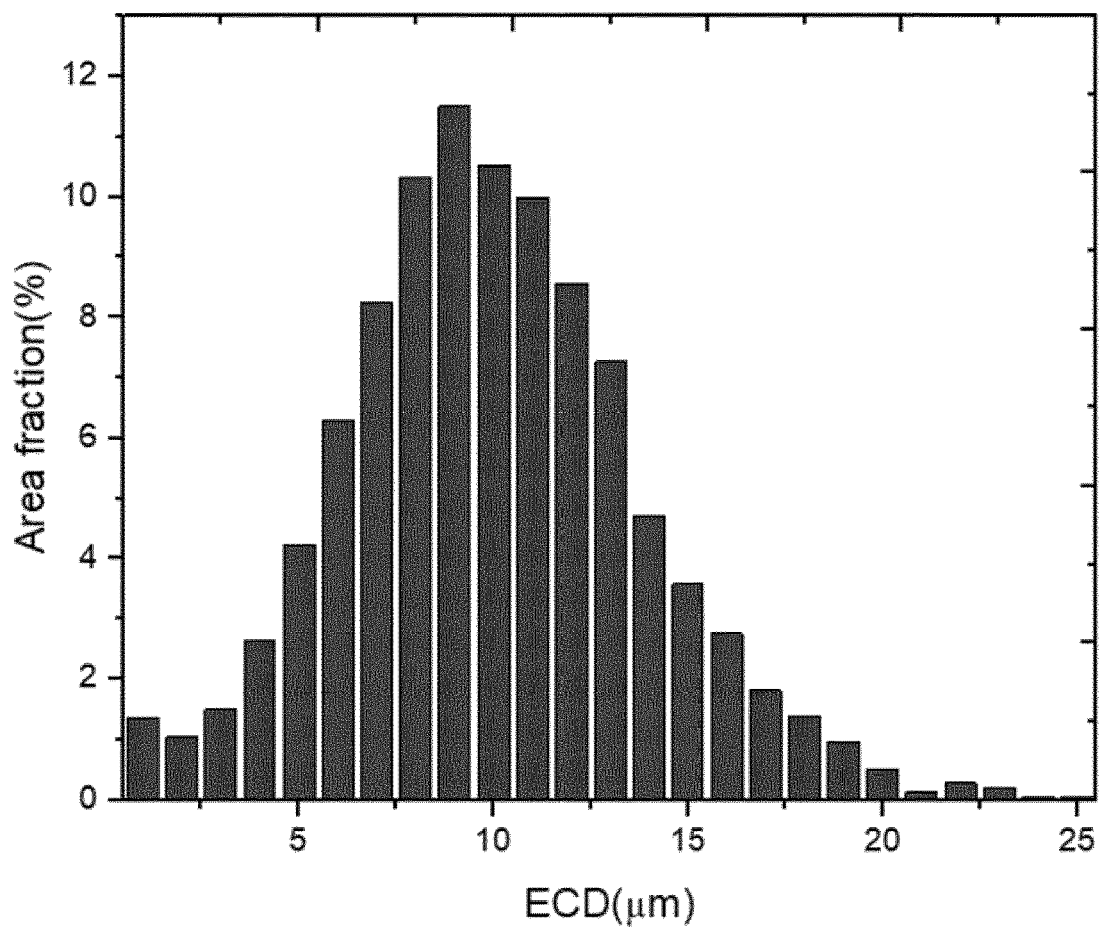
FIG. 8 is a graph showing the cBN grain size distribution of the tool material.

The grain sizes were taken from 33 micrographs and in total, more than 30,000 samples of grain sizes were measured. cBN grain size is expressed as Equivalent Circle Diameter (ECD). The results are shown in FIG. 8. The average cBN grain size was 9 μm.

Figure 9:
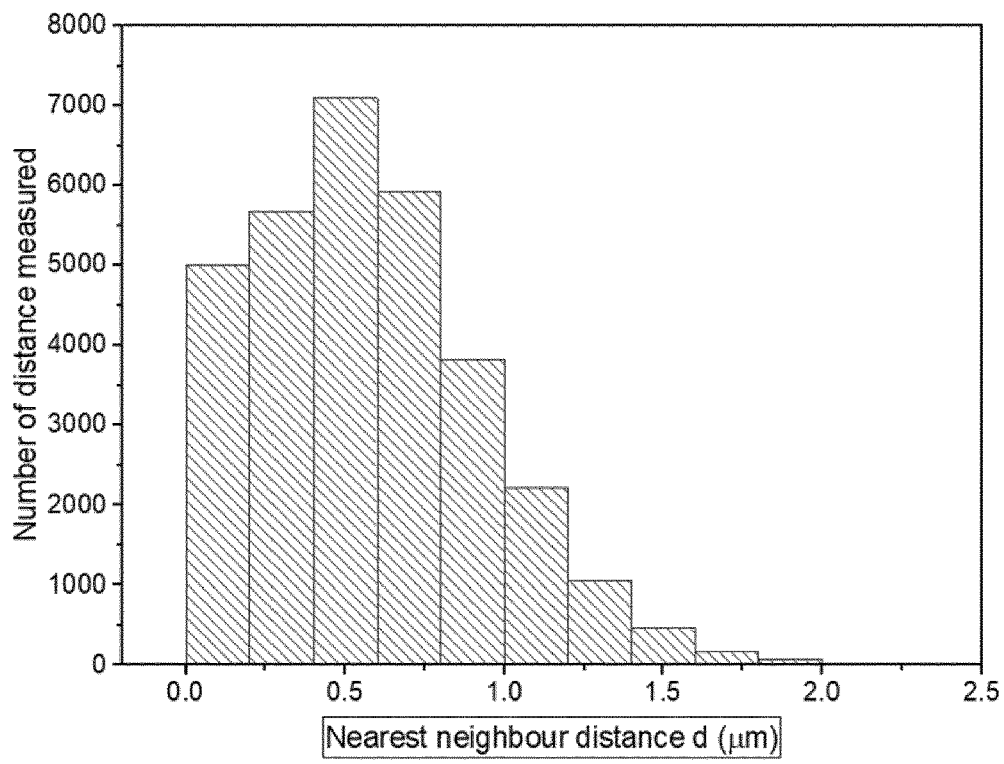
FIG. 9 is a graph showing the distance between cBN grains of the tool insert material, expressed as nearest neighbour distance, d (μm)

The distance between similar grains, i.e. nearest neighbour distance, was also analysed, with the results shown in FIG. 9, which indicates that the distance between cBN grains ranged from 0.1 to 2.0 μm.

For comparative purposes and to understand the numerical limit of near neighbour distance, a second cBN material, coded Ct1291, was analysed. The composition of Ct1291 is provided in Table 2.

TABLE 2

| CBN (Volume %) | Particle size (μm) | Binder (Volume %) | Composition (Weight %) |
|---|---|---|---|
| 70 | 1.5-4 | 30 | TiN/Al (90/10) |

Figure 10:
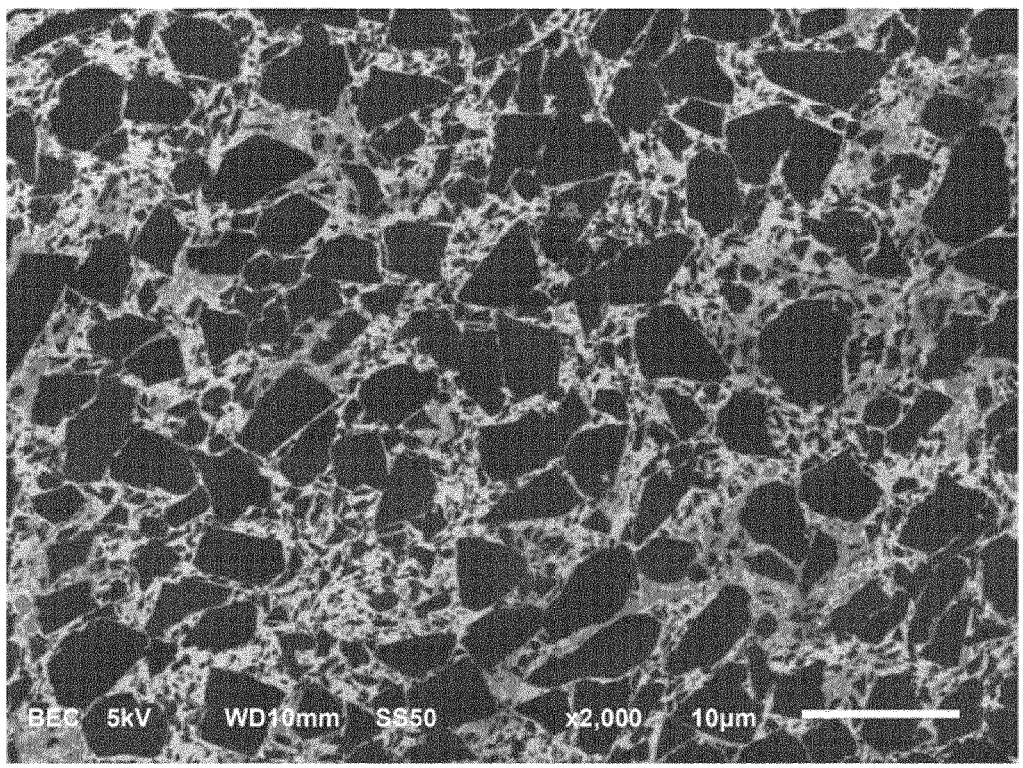
FIG. 10 is an SEM micrograph showing the microstructure of a known TiN/Al PCBN material at a magnification of 2000× for comparison with the tool insert microstructure.
Figure 11:
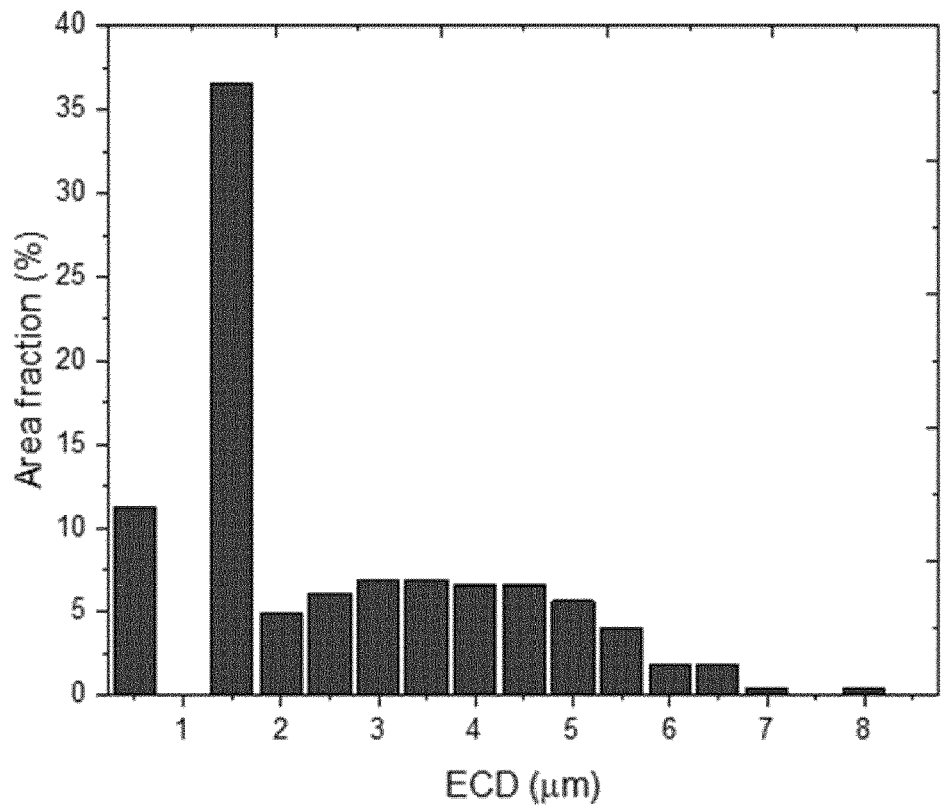
FIG. 11 a graph showing the cBN grain size distribution of the TiN/Al PCBN material of FIG. 10.
Figure 12:
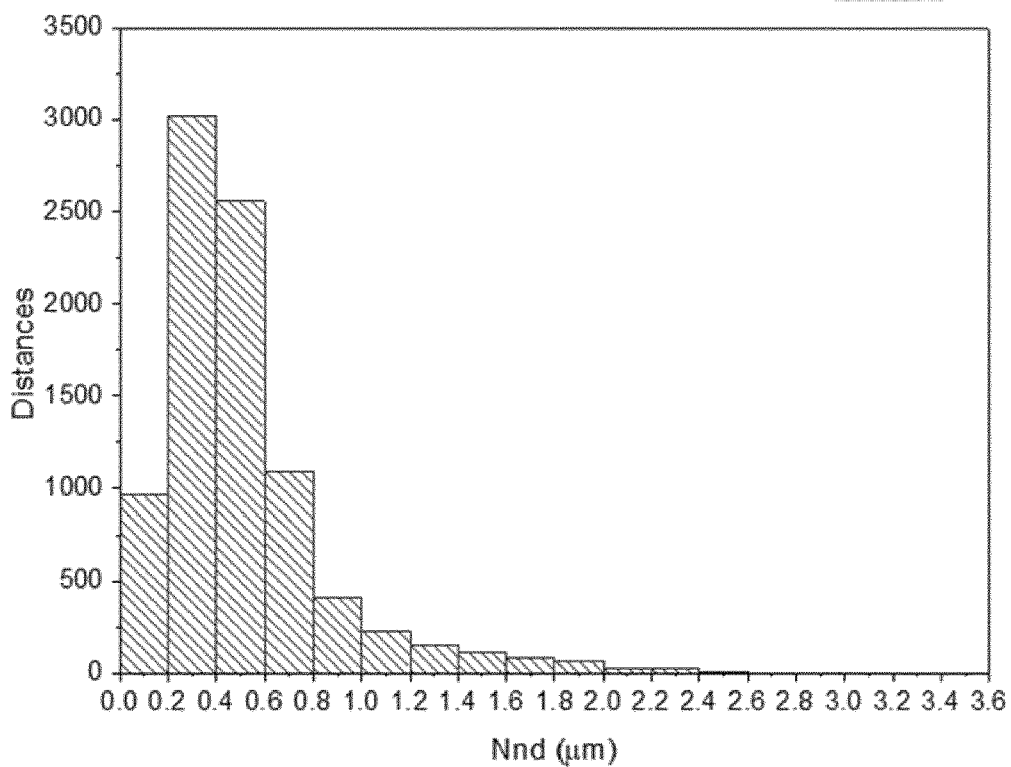
FIG. 12 is a graph showing the distance between cBN grains of the TiN/Al PCBN material, expressed as nearest neighbour distance, d (μm)

The microstructure, the cBN grain size distribution and the nearest neighbour distance for Ct1291 are shown in FIGS. 10, 11 and 12, respectively. For an average grain size of 1 to 2 μm, the average nearest neighbour distance, d, is 0.3 μm, and individual results varied between 0.1 and 2.0 μm.

Returning to the sintered tool insert material, due to the presence of aluminium in the precursor powders, the cBN grains were found to have a reacted layer (i.e. a coating) of aluminium nitride and/or aluminium diboride (AlN/AlB$_2$) on the surface of the sintered cBN grains. The thickness of the reacted layer, the measurement of which is described in more detail later, reflects the HPHT sintering conditions used. Improved toughness and abrasion resistance of the composite material is attributed to the reacted layer. It is proposed that it is the reacted layer that makes the composite material particularly suitable use in FSW, as described in more detail below.

The benefit of the coating is that it is believed to enhance the mechanical properties of the sintered material. By ensuring strong bonding between the cBN particles and the W—Re binder, it may enhance both the toughness (the cBN supporting the W—Re) and the wear resistance (the cBN being retained and supported by the W—Re) of the material. It is also believed to halt inter-granular cracking.

The coating may also reduce the thermal conductivity of the composite. The thermal conductivity is dominated by the volume fraction of cBN in the material, since this has a much higher thermal conductivity than the W—Re binder. However, the effect of the cBN on the thermal conductivity could be modified by using smaller cBN particles, and also by the coating on the cBN particles, causing poorer thermal connectivity between them (different phonon structure in the interface layer). Using this tool result may result in a better heating of the workpiece because less heat is being conducted away by the tool as it has a lower thermal conductivity. Notably, the coating formed by Al reaction is likely to be more chemically disordered than any prior metal coating.

Figure 13:
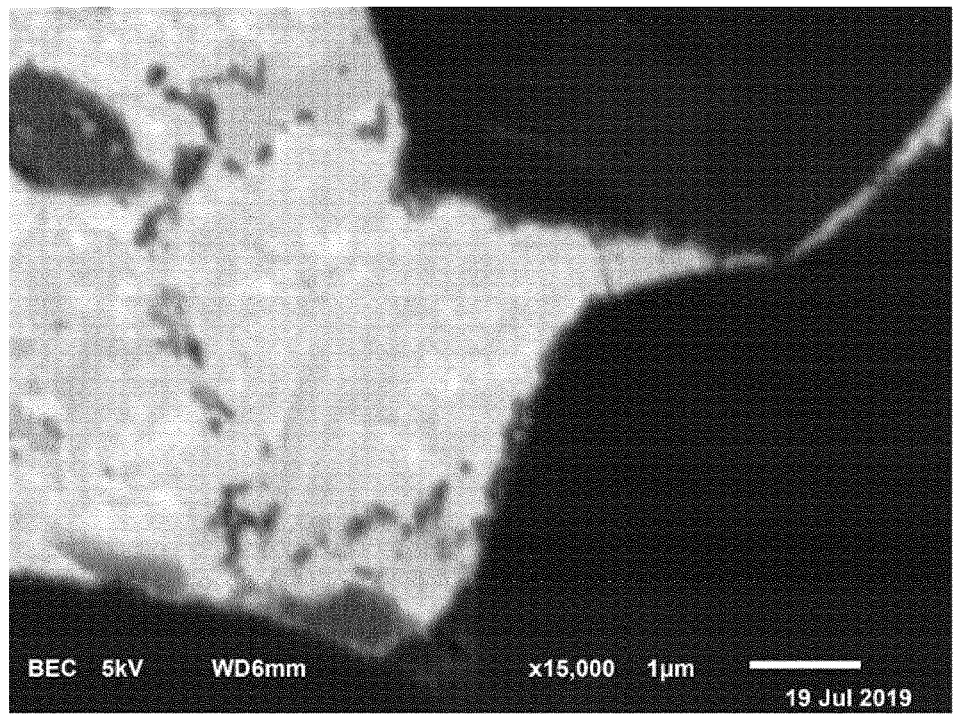
FIG. 13 is an SEM micrograph of a cBN grain within the tool insert microstructure at a magnification of 15,000×.
Figure 14:
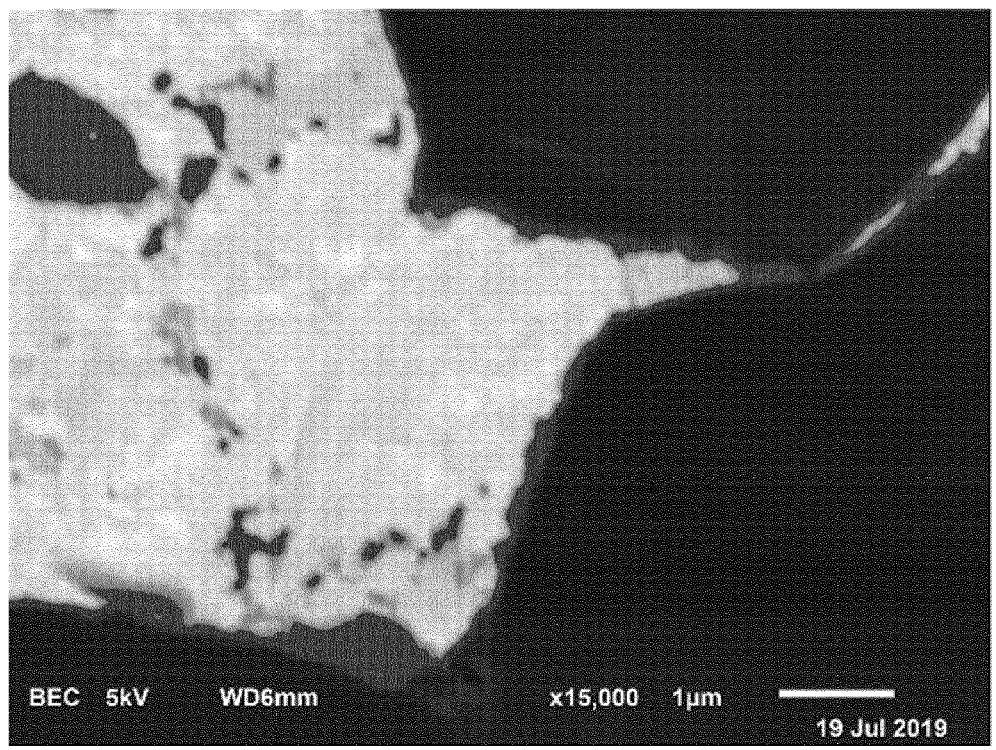
FIG. 14 is a manipulated copy of the SEM micrograph of FIG. 13 indicating a reacted layer at least partially covering the cBN grain.
Figure 15:
FIG. 15 is a manipulated copy of the SEM micrograph of FIG. 13, indicating only the reacted layer, extracted for the purposes of calculating the thickness of the reacted layer.

For the purpose of the analysis, the reacted layer was identified in e.g. FIGS. 13 and 14, and separated visually from the cBN grains using software, e.g. see FIG. 15, in order that the thickness of the reacted layer could be measured.

Figure 16:
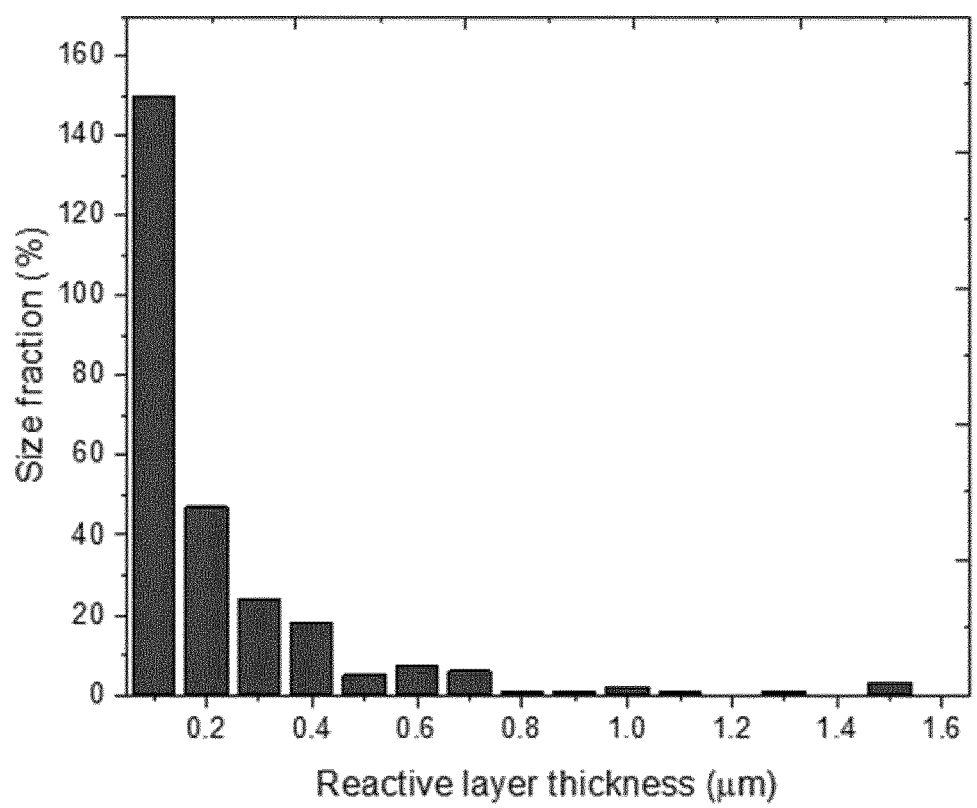
FIG. 16 is a graph showing the distribution of thickness of the reacted layer.

As indicated in FIG. 16, the average thickness of the reacted layer was 180 nm, with individual results ranging from 0.1 μm to 1.6 μm.

Young's Modulus and Speed of Sound

The Young's modulus of each of three batches of tool insert tested was calculated after measuring the longitudinal speed of sound and calculating the density of each tool. The density of the tools was calculated using Archimedes Principle.

$$Y = \rho v^2 \qquad \text{Young's modulus}$$

(where, ρ is the density of the solid and v is the speed of sound)

The results are provided in Table 3.

TABLE 3

| Batch No | Capsule No | Density (g cm⁻³) | Speed of Sound (kms⁻¹) | Young's Modulus (GPa) |
|---|---|---|---|---|
| Batch 1 | 1114 | 7.62 | 8.5 ± 0.02 | 550 |
|  | 1116 | 7.63 | 8.54 ± 0.03 | 556 |
| Batch 2 | 2188 | 7.57 | 8.29 ± 0.04 | 520 |
|  | 2189 |  | 8.21 ± 0.01 | 510 |
| Batch 3 | 2267 | 7.61 | 8.48 ± 0.02 | 547 |

Knoop Hardness

Figure 17:
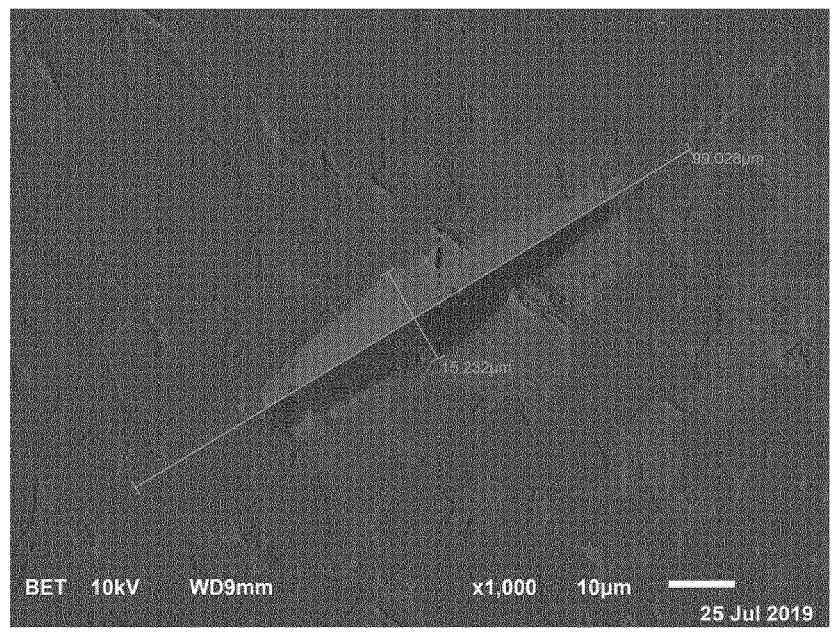
FIG. 17 is a manipulated SEM micrograph, at magnification 1000×, of a Knoop hardness indentation.

The Knoop microhardness of the material was measured under a load of 1 Kg and a dwell time of 15 seconds on a mirror-polished surface, as indicated in FIG. 17. At least 16 indents were measured to obtain an average microhardness of the material.

Knoop Hardness:

$$HK = 0.014229 \times \frac{P}{d^2}$$

(where, HK is the Knoop hardness in GPa, P is the applied load in Kg, and d is the length of the diagonal)

The Knoop hardness results are provided in Table 4.

TABLE 4

| | Indent: | | | | | | | |
|---|---|---|---|---|---|---|---|---|
| | 1 | 2 | 3 | 4 | 5 | 6 | 7 | 8 |
| Hardness (GPa) | 16.59 | 14.05 | 18.17 | 23.87 | 11.11 | 14.22 | 18.04 | 15.32 |
| | Indent: | | | | | | | |
| | 9 | 10 | 11 | 12 | 13 | 14 | 15 | 16 |
| Hardness (GPa) | 22.13 | 21.76 | 16.35 | 17.06 | 11.94 | 14.87 | 16.56 | 18.13 |

The average Knoop hardness of the tool material is 16.9±3.5 GPa. The variation in the results is inherent to this type of composite material and due to indenting either a binder dominated region or a cBN dominated region.

Method of Manufacture

Figure 18:
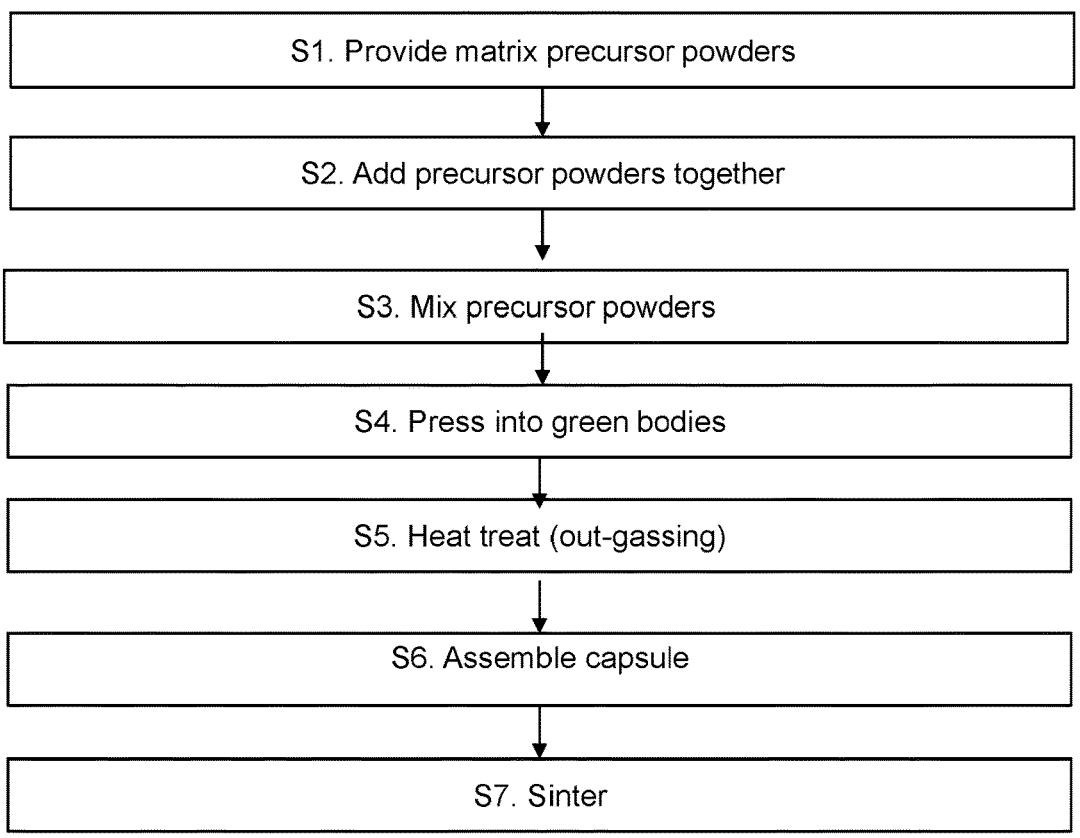
FIG. 18 is a flow diagram showing an exemplary method of making a sintered PCBN material.
Figure 19:
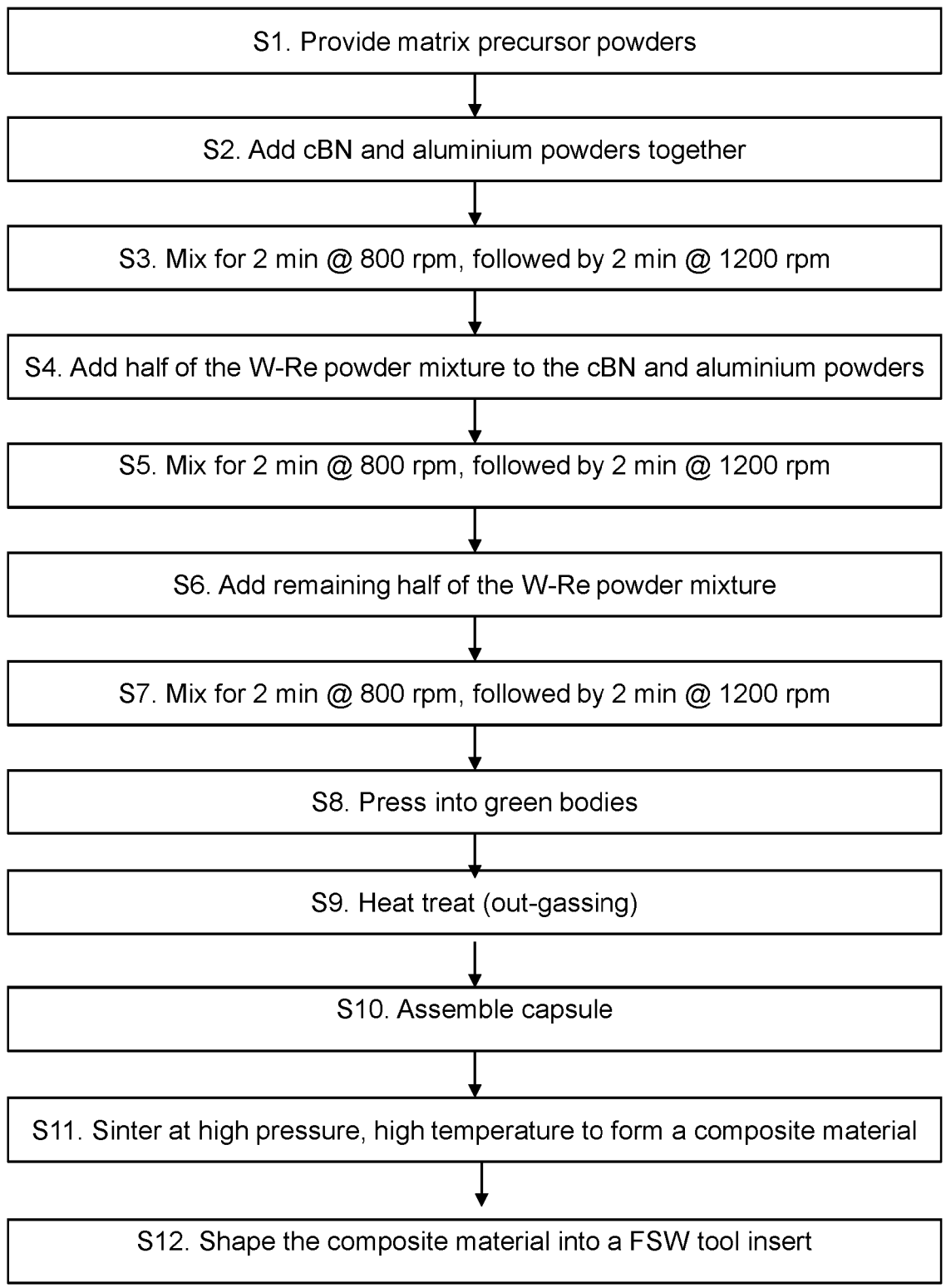
FIG. 19 is a flow diagram showing the exemplary method of FIG. 18 with additional, optional, sub-steps.

FIGS. 18 and 19 shows an exemplary method for producing the sintered tool PCBN material. FIG. 19 shows the same process as FIG. 18 but with optional, additional steps. The following numbering corresponds to that of FIGS. 18 and 19.

S1. Matrix precursor powders were provided in a cBN to binder volume percent ratio of 70:30.

S2. cBN powder was added to W—Re and Al (metallic) binder powders. The average size of the cBN particles in the cBN powder is between 8 and 20 µm. The size distribution of the cBN may be mono-modal or multi-modal (including bi-modal). The binder had the composition W—Re 98 wt. % and Al 2 wt. %. The quantity of aluminium added takes into account the estimated surface area of the cBN grains to ensure at least partial coverage.

The proportion of tungsten to rhenium within the W—Re mixture is optionally any of the following ratios: 95:5, 90:10, 80:20, 74:26, 70:30, 60:40, 50:50.

The powders were mixed following the sequence below:

S3. cBN powder and aluminium powder were mixed for 2 minutes at 800 rpm, then for 2 minutes at 1200 rpm;

S4. Half of the W—Re powder mixture was then added to the cBN powder,

S5. The powders mixed for 2 minutes at 800 rpm, then for 2 minutes at 1200 rpm;

S6 The remaining W—Re powder mixture was then added to the cBN—W—Re mixture,

S7. The powders mixed for 2 minutes at 800 rpm, then for 2 minutes at 1200 rpm.

The precursor powders were mixed together using a SpeedMixer™, which is a bladeless dry powder mixer. The advantage of using this route is that, unlike attrition milling, impurities from milling media are avoided. Attrition milling is conventionally used not only to break down the matrix precursor particles to a desired size, but also to intimately mix and disperse the matrix precursor particles and the cBN particles. Attrition milling is usually performed with tungsten carbide balls. A sintered PCBN material, producing using attrition milling, can contain up to 8 wt. % tungsten carbide, typically 2 wt. % to 6 wt. % tungsten carbide. These particles are known to have a detrimental effect on the properties of the PCBN material, particularly in applications such as hard part turning. Furthermore, the tungsten carbide pickup during attrition milling is not controlled, so different batches may contain different amounts of tungsten carbide with different size distributions, leading to unpredictable performance of the sintered PCBN material when used in a tool application.

Another advantage of this route is that there is no crushing of cBN grains. The effect is that sintered cBN grains within the composite material have a greater sharpness than those sintered after attrition milling. The sharpness may also enhance material integrity and toughness. Sharpness is explained in more detail below.

Additionally, a bladeless mixing route reduces the reactivity of the precursor powders so that they are safer to handle. Lastly, with higher purity precursor powders (significantly less contamination), the sintered PCBN is stronger.

Figure 20:
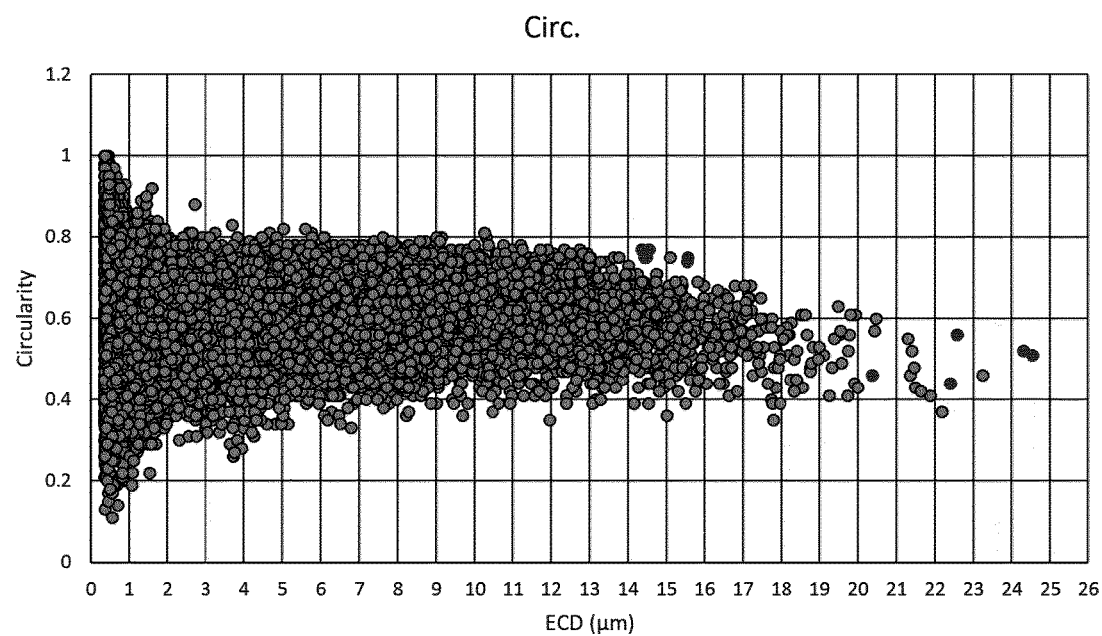
FIG. 20 is a graph indicating the grain sharpness of cBN grains in the sintered material.

The grain sharpness may be used as an indicator of the mixing route used since the sharpness of the cBN grains pre- and post-sintering is primarily determined by the mixing route. Using a bladeless dry mixer mix produces cBN grains with a different grain sharpness compared to those shaped by attrition milling. More detail on how the grain sharpness is calculated is provided later. More than 24000 grains were analysed from SEM micrographs taken at 500× magnification. ImageJ software was used for the analysis. The mean circularity was 0.62±0.1. The spread of results is provided in FIG. 20. The measurement is not accurate in small grain sizes, here being less than 1 micron, hence the circularity is based on grain sizes above 1 micron.

It is envisaged that ultrasonic mixing in a solvent or dry acoustic mixing may be used as an alternative to bladeless mixing described above. As such, the level of impurities found in the sintered composite material is less than 4 wt. %, and may be less than 3 wt. %, or 2 wt. %, or 1 wt. %. Even though tungsten carbide impurities can be avoided, there may still be trace amounts of iron impurities stemming from the raw precursor powders.

Bladeless mixing, ultrasonic mixing and dry acoustic mixing all offer a faster and more efficient way of mixing compared to attrition milling, with the benefit that the time taken to prepare the sintered PCBN material is greatly reduced.

S8. The mixed powders were then pressed into green bodies. Pre-compaction is necessary to ensure that there is a minimal change in volume during the final sintering. If density is not maximised before sintering, then increased shrinkage may lead to a decrease in pressure while sintering, resulting in conversion of cBN to hexagonal boron nitride (hBN) and cracking of the samples.

S9. The green body was introduced into an enclosure, also known as a "can", formed from a refractory metal such as niobium. The can containing the mixture was then placed in a vacuum furnace (Torvac) and subjected to elevated temperature conditions under vacuum. This step removes excess oxygen from the mixture, and subsequently aids sintering. Outgassing was performed at a temperature of between 900° C. and 1150° C. Outgassing is an important factor in achieving a high density in the finished composite material. Without outgassing, the sintering quality is poor. Outgassing is often carried out overnight, for a minimum of 8 hours depending on the quantity of material being outgassed.

S10. After outgassing, the can was sealed whilst still in the outgassing conditions, and the can containing the mixture subsequently placed within a HPHT capsule.

S11. The can containing the mixture was then subject to high pressure and high temperature condition for full sintering. The sintering temperature was between 1300° C. and 1600° C., whilst the pressure was at least 3.5 GPa. The sintering pressure is usually in the range of 4.0 to 6.0 GPa, preferably between 5.0 and 5.5 GPa. The sintering temperature is preferably around 1500° C. Full sintering forms a polycrystalline material comprising particles of cBN dispersed in a matrix material.

After the sintering process, the pressure was gradually reduced to ambient conditions. The fully sintered composite material was left to cool to room temperature and subsequently shaped into a tool suitable for friction stir welding. Historically, FSW tools have been shaped into the necessary geometry using grinding, but this is not without drawbacks and so an alternative shaping process was sought.

S12 In a preferred process, the composite material is subsequently shaped using laser ablation, a form of subtractive manufacturing, to form a tool insert suitable for friction stir welding.

Laser Shaping

One key benefit from using pulsed laser ablation is that it minimises the amount of sub-surface damage caused during the shaping process. It is believed that sub-surface damage is reduced compared to grinding, which helps delay premature failure due to crack propagation and fracture.

Figure 21:
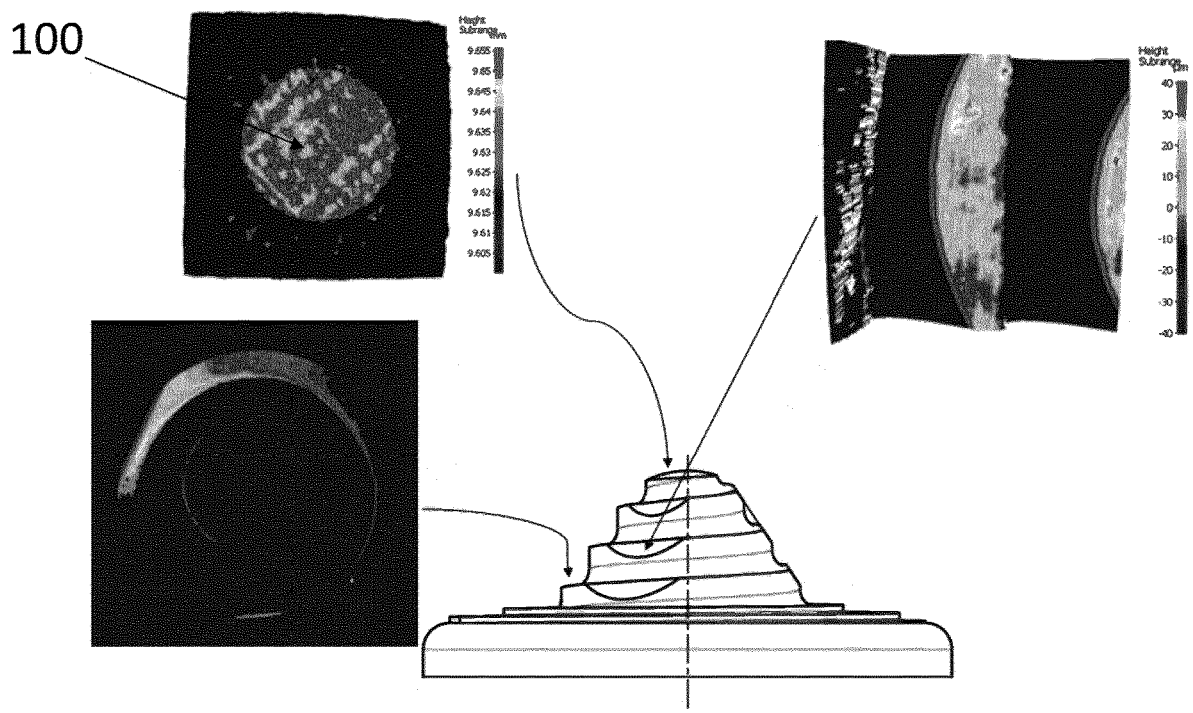
FIG. 21 is a compilation image showing the variation in surface depth at three different locations on the friction stir welding tool insert of FIG. 1.

Another key benefit is that the laser produces a textured outer surface layer 100 as a controllable by-product of the shaping process—see FIG. 21. The textured surface layer 100 helps to generate the heat necessary for FSW process. Properties of the textured surface layer 100 are controlled by inputs into the laser control program, for example, angle of incidence on the article, fluence, power, pulse repetition rate, pulse duration, and pulse pitch.

The textured surface layer 100 is homogenous with the core of the tool insert 10, yet has a different microstructure. The textured surface layer 100 was found to have a depth of between 0.5 and 50 μm. In one embodiment, the textured surface layer 100 has a depth of around 40 μm.

The textured surface layer 100 comprises a boundary layer and a plurality of surface features. The boundary layer provides texture on a macro-level (μm), and the surface features provide texture on a micro-level (nm), as explained in more detail below. The surface features extend outwardly from one side of the boundary layer. On an opposing side of the boundary layer, the textured surface layer 100 interfaces with the bulk material belonging to the tool insert 10 core.

By programming the laser, certain locations on the tool insert 10 may be targeted for selective texturing. For example, the surface features may be selectively located only on the working surfaces 28 of the tool insert 10—for example, see Table 5. They may alternatively continuously cover the entire tool insert 10.

TABLE 5

| Location | Ground or lasered | Sa (μm) | Sq (μm) |
|---|---|---|---|
| A, on body portion | Ground | 0.5 | 0.7 |
| C, on body portion | Lasered | 7.0 | 9.0 |
| Spiral | Lasered | 2.5 | 3.1 |
| B, on body portion | Lasered | 1.5 | 1.9 |

In contrast to conventional grinding, the (mid-sized) surface features in the outer surface layer 100, lasered to improve the mechanical coupling at the puck/PSV interface, have a maximum deviation of around 10-200 μm and an Sa of around 1.5-20 μm. The mid-sized features show lay with the appearance of parallel lines or edges in one dimension (often curved along a circumferential line of the axis of rotation), or a square mesh like arrangement in two dimensions, with a horizontal repeat frequency of around 10 μm-500 μm depending on the precise design.

Whilst sufficiently large aperiodic features would have some benefit in this application, it would be both harder to produce an aperiodic feature, and would at the same time compromise benefit over a periodic design that can select the appropriate lateral repeat frequency and apply it everywhere, and so a distinct lay in the surface texture is preferred. This does not exclude the use of a complex repeat pattern, where more than one periodicity is present.

To summarise:

TABLE 6

| | Typical of grinding (μm) | Coupling surface features (μm) | Spiral design features (mm) |
|---|---|---|---|
| Typical maximum excursion | 4-8 | 10-200 | >1 |
| Typical Sa | 0.3-1 | 1.5-20 | N/A |
| Lay | None | Typical parallel lines or square mesh, often fragmented | Often geometrically related to axis of rotation |
| Lateral repeat or characteristic lateral dimension | N/A | 10-500 | >1 in at least one dimension |
| Other comments | Lateral distribution random | | |

At the other end of the size scale, the macroscopic design features of the reverse spiral are typically of the order of 1 mm or larger in at least one dimension and more typically two dimensions.

Optimisation of the coupling features has shown that whilst the typical maximum excursion is 10 μm-200 μm and lateral repeat 10 μm-500 μm, it is often preferable to work in the smaller end of these range to increase the number of features and minimising slip locally, subject to avoiding premature wearing by making the features too small to survive long.

Thus, preferably the coupling features show a typical maximum excursion of 10-100 μm, 10-50 μm, or 15-30 μm. Preferably, the coupling features show an Sa of preferably 1.5-15 μm, preferably 1.5-10 μm, preferably 2-10 μm, or 3-10 μm. Preferably, the coupling features show a lay with a characteristic lateral dimension of 10-100 μm, preferably 10-50 μm, or preferably 12-30 μm.

Actual measurements on pucks have shown the following to be typical measurements with the materials and laser processing parameters used here. For comparison, measurements on fully ground pucks are also reported.

TABLE 7

| | Typical of grinding (μm) | Ground puck (μm) | Laser processed puck (μm) | Spiral design features |
|---|---|---|---|---|
| Typical maximum excursion | 4-8 | | | >1 mm |
| Typical Sa | 0.3-1 | 0.5 | 1.5, 2.5, 7.0 6, 7, 6, 2.6, 6, 2.6 | N/A |
| Lay | None | | Square mesh (fragmented), Circumferential parallel lines (well defined) | Often geometrically related to axis of rotation |
| Lateral repeat or characteristic lateral dimension | N/A | 10 | 13 μm (mesh), 100-300 μm apart circumferential parallel lines, 200-400 μm apart radial ridges | >1 mm |
| Other comments | Lateral distribution random | | | |

Since the objective is to provide mechanical coupling between the puck and the workpiece material, then the alignment of the coupling features is also potentially relevant. In the case of the square mesh alignment is less of an issue, but in the case of parallel features there is a more obvious benefit from radial ridges than from circumferential ridges which run along the direction of surface movement arising from rotation. That said, there are locations on the tool such as the small area at the very tip of the apex, where effective radial lines are difficult to apply but where circumferential steps can provide both a useful rounded profile and a greater surface area for mechanical coupling. Conversely, on the spiral step running down the tip, radial ridges are both easier to form, more in keeping with the macro-geometry around them and more effective at giving the necessary coupling. Hence the precise geometry used to enhance coupling can vary according to the location on the tool puck.

Figure 22:
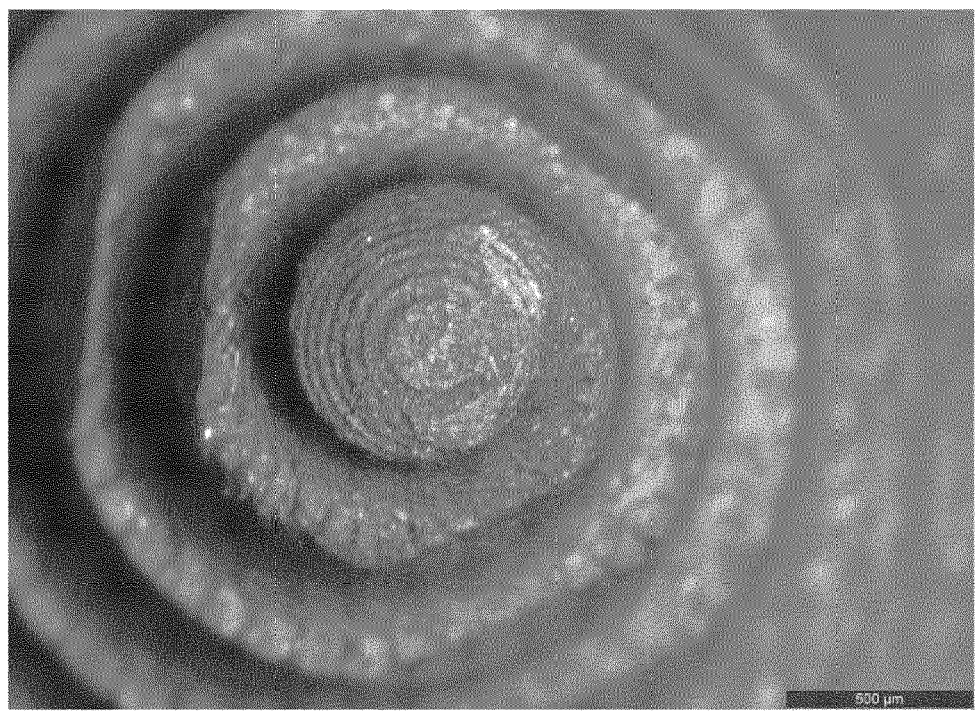
FIG. 22 is an image showing a plan view from above of the tool insert, and in particular surface topography obtained by laser ablation during shaping of the tool insert.
Figure 23:
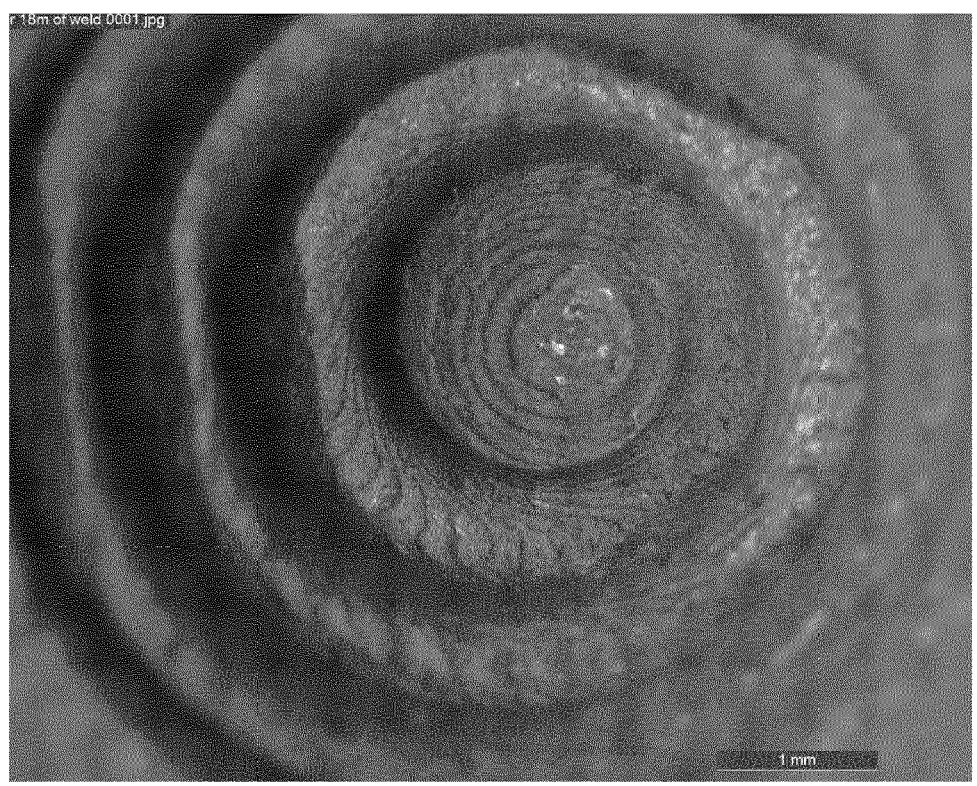
FIG. 23 is a further image showing a plan view from above of the tool insert, and again the surface topography obtained by laser ablation during shaping of the tool insert.

In particular, on the images of the pucks shown in FIGS. 22 and 23, it can be seen that circumferential steps about 35 μm high have been applied to the apex, enhancing the surface area and providing a nice curved profile to the apex. The need to curve the apex means the lateral spacing between steps varies in the range of about 200-400 μm.

Conversely, further down the (reverse) spiral ramp can be seen largely radial ridges which are about 400 μm apart, and about 25-50 μm high.

Level of Oxygen

Oxygen is detrimental to the performance of the tool insert. Al additives are beneficial to tool performance, unless they are in the form of an oxide. Likewise oxygen contamination in the source materials used to sinter the tool insert, or exposure of the tool to atmospheric oxygen whilst the tool is at operating temperature (>600° C.) is also detrimental.

Measuring oxygen in PCBN, as with many other materials, needs care to avoid atmospheric contamination affecting the measurement. It can be achieved by Energy Dispersive X-ray Spectroscopy (EDS) in an SEM, or by atomic ionisation techniques.

Preferably, the total oxygen content of the composite material is less than 3%, preferably less than 2%, preferably less than 1%, preferably less than 0.5%, preferably less than 0.3%.

Test Methods
Thickness Measurement Method for the Reacted Layer
The following steps were used:
Calibrate the SEM images with the scale bar;
Identify the reacted layer using grey scale threshold identification techniques;
Binarize the image to highlight only the reacted layer adhering to the cBN grain;
Apply a grid with 100 nm gap both in the horizontal and vertical direction, and
Measure the thickness in both directions.
XRD Procedure for Peak Ratio Calculation
The XRD study was carried out on a Philips Xpert™ X-ray diffractometer, under the following conditions:

TABLE 8

Parameters

| | |
|---|---|
| Sample size: | 25 mm diameter surface |
| Generator setting (Accelerating voltage and current) | 40 KV, 40 mA |

TABLE 8-continued

| Parameters | |
|---|---|
| Anode material | Cobalt |
| Wavelength of K-α1 | 1.78901 (Å) |
| Scan range (2θ range) | 20-80° |
| Step size for scan (2θ) | 0.017 |
| Scan time (s) | 370.2 |
| Scan type | Continuous |

The ratio of the area under the XRD peak were calculated, and the composition of the material determined as indicated in the table below.

TABLE 9

| Compound | AlN | AlRe$_2$ | AlRe$_2$ | W |
|---|---|---|---|---|
| Peak Position (2θ°) | 54.039 | 21.12 | 36.58 | 68.96 |
| Ratios | AlN/CBN (%) | AlRe$_2$/CBN | AlRe$_2$/CBN | W/CBN |
| Reflection plane | (002) | (002) | (011) | (200) |
| Batches | | | | |
| Batch-3 | 6.087855 | 6.640826873 | 20.41344 | 256.8992 |
| Batch-2 | 0 | 8.163265306 | 7.544836 | 198.5158 |
| Batch-1 | 0 | 0 | 13.28244 | 265.1908 |

Speed of Sound Measurement

Scanning Acoustic Microscopy (SAM) was used as a non-destructive method to detect and quantify flaws in components before failure and also to determine the speed of sound of the material.

The KSI v400™ SAM machine from Kramer Sonic Industries GmbH was used, under the following conditions:

TABLE 10

| Specimen dimension | 25 mm dia, 25 mm height |
|---|---|
| Transducer location | 2 mm above the sample |
| Wave speed | 8642 m/sec |
| Measurement peaks | Top surface peak and the back surface peak |

Performance Testing of the Tool Insert

Optionally, the tool has a low average wear rate ratio in use, and can survive a large number of plunge cycles without failure. The wear rate is measured as the average wear rate being measured in the axial direction over the central region of the tool (the apex of the tool), out to a diameter equal to the pin length, and is given as a figure per metre of weld completed (e.g. is divided by the length of the test weld in metres).

In terms of characterising the performance of the tool, the tool normally fails by one of two mechanisms, either wear causing substantial loss of the surface features of the tool which drive metal down the pin to fill the void behind the tool as it traverses, or cracking substantially degrading the shape of the tool. Whatever their initial source, cracks typically develop under the cyclic loading on the pin such that then end up surrounding the base of the pin and resulting in the pin shearing off. Two sources of cracks have been identified, the prime one being the high local loading during the plunging of the tool into the cold workpiece, and a second one being poor mounting of the tool in the tool holder. Thus, the key parameters of the tool lifetime are:

The number of metres welded (before the weld quality is significantly adversely affected by wear or fracture). As noted earlier, unless cracking intervenes, the dominant issue here is the wear rate of the tool, and this is largely a characteristic of the tool material. Since life testing of high-performance tools is very expensive, the more practical test is to measure the wear rate over a given length of weld, and that approach is adopted here.

The number of plunges into the workpiece, which can cause cracking and thus failure. The forces acting during the plunge can be mitigated by several known methods, such as pre-heating the workpiece of drilling a pilot hole. For the purposes of the test, the plunge is completed by plunging into a workpiece at room temperature without any special preparation or mitigation technique for the plunge.

Standardised FSW Test for Wear Rate Measurement

The wear rate test will first be described for a tool designed for 6 mm weld, and then be generalised for other tool sizes. The pin length of the tool is 95% of the depth of the intended weld, thus for a 6 mm weld depth ($D_W$), the pin length of the tool (L) is 5.7 mm. Reference to a 6 mm tool refers to the intended weld depth, $D_W$ and thus to a tool with a pin which is 5.7 mm.

The tool is mounted in a tool holder which is mounted into a milling machine suitable for applying the conditions that follow for FSW. The conditions are described primarily for testing a tool suitable for making a 6 mm deep weld, but the method by which this is scaled to other tool sizes is then given.

The workpiece is DH 36 steel. For simplicity, the test does not need two separated plates prior to welding, but can be made within the area of a single plate, and the plate thickness is typically oversize at approx. 8 mm to avoid this being a critical factor in the test. The tool is tilted slightly throughout the test, to point the pin forward in the direction of traverse at an angle of 0-5 degrees, typically 2 degrees.

A shield gas of Ar is maintained in place during the test, to avoid the tool and workpiece from coming into contact with atmospheric oxygen during the weld.

The key variables in FSW are (standard SI units are assumed throughout):

L=Pin length (m)

v=Traverse velocity (m/s)

ω=Rotation rate of tool

Three forces are applied to drive this behaviour:

$F_A$=Axial load (N)

$F_T$=Traverse force (N)

$F_R$=rotational force (N·m)

The rotation rate of the tool is varied during the initiation of the process:

Insertion: The cold tool is rotated at 800 rpm and brought at a slow steady approach to the workpiece, such that the plunge takes about 90-120 seconds to complete.

Traverse: Tool rotation rate is dropped to 200 rpm, and the tool is traversed at 0.3 m/min or 0.005 m/s.

Extraction: Tool rotation continues as for the traverse. The argon purge gas is maintained until the tool has cooled sufficiently to avoid risk of oxidation. This point needs to be emphasised—oxidation of the tool insert by use of an insufficiently effective inert gas (typically argon) purge during the cool down after extraction can lead to a substantially increased wear rate, the possible increase being greater than a factor of 10.

Measuring the Number of Plunges (Plunge Life)

The tool is plunged as described above and then traversed for a minimum of 1 m before extraction and repeat, and the total number of plunges counted. The plunge forces are not mitigated by using techniques such as pre-heating the workpiece or drilling a co-axial or offset pilot hole, but performed on a plane surface of a workpiece initially at room temperature. More typically, to combine plunge tests and wear testing, the weld test for wear described below is completed in approximately 2 metre sections. The precise conditions for the plunge can be optimised using the common skills of those skilled in the art, to minimise the shock load on the tool tip (the combination of forces and thermal shock from the frictional heating), to maximise the plunge life of the tool.

The tool insert of the invention is capable of withstanding at least 10, 20, 30, 50, 100 plunges without any brittle damage such as chipping or cracking being visible on the tool insert under optical microscopy.

In contrast, prior art tools are known to fail after the first plunge, particularly when no plunge mitigation is used, and generally do not survive beyond five plunges.

Measuring the Wear Rate of the Tool.

Typically the highest wear rate of the tool insert 10 is seen at the base of the pin where it curves into the shoulder 20 of the tool insert 10. To measure wear rate and provide for comparison between tool inserts 10 a protocol needed to be established, since this is not a measurement previously reported in a systematic fashion, since most FSW tools to date have failed quickly in steel.

The wear rate is a function of certain other test parameters, and so the other conditions of test need to be specified or optimised. Here are specified sensible starting parameters, but those of ordinary skill in the art may achieve minor improvement in tool insert life by optimisation of the parameters, and such optimisation is expected for the test. The tool traverse, which is the stage primarily forming the weld and generating the wear, is performed under constant conditions; the conditions relating to the pin length, the rotational speed of the tool, and the speed of the traverse. The process can be run in positional control if the machine traverse is accurately aligned to the workpiece, however to allow for minor distortion to the workpiece those skilled in the art will understand that it is generally more appropriate to control on applied forces, which allows responsiveness to local workpiece variations. In any event, once the tool traverse is initiated, the conditions should remain essentially constant for the duration of the traverse until the end of the weld is approached. These conditions are considered herein as being 'steady state operation'.

The following protocol has been found to be the robust and reliable. The objective is to measure material loss by wear on the tool, and to provide this figure as an average linear wear rate per metre of weld length. To maximise the sensitivity of the test, the measurement is constrained to a circle equal in diameter to 1.5× the pin length around the axis of rotation of the tool insert. In principle there are several ways to measure the volume loss by wear from the tool, but since the tool does not have re-entrant features the simplest method is to use a 3D optical microscope, with images taken of the tool tip along the axis of rotation before use and periodically during testing. From the 3D images, it is possible to generate subtraction images, showing the difference in height between the various surfaces in the image as a function of the use of the tool, and from this calculate the change in height along the direction parallel to the axis of rotation at each point in the image, within the circle defined by a diameter equal to the pin length. This gives the total volume of material lost, which is divided by the area of the circle to obtain an average wear rate, and then by the length of the weld in order to give a wear rate per metre of weld.

For clarity, one would ideally like to complete all ratio calculations using base SI units, that is based on metres and seconds rather than any other sub-units such as mm and μm, but the scale of the parameter values in this field make this impractical. Therefore, the following units are adhered to throughout this specification:

Pin length L in mm
Wear in μm
Wear rate (WR) in μm/m
Wear rate ratio (WRR) in μm/(m·mm)
Rotation rates in cycles per minute It is possible for the rate of wear of the tool to increase as the tool wears substantially, as the interaction between tool and workpiece may become less efficient. It is also possible for the wear rate to be artificially high initially if there is any surface damage introduced into the tool by the processes used for shaping (e.g. by grinding). Furthermore, to ensure sufficient wear to measure accurately, at the low levels of wear envisaged in this specification, the wear needs to be measured over a number of metres of weld. The wear is not significantly affected by the number of plunges as long as this number is kept reasonable.

Thus, the test needs to be carried out over a minimum of 9.5 m (e.g. nominally 10 m) of weld ($D_W$), and generally less than 35 m (although this is a practical limit only), using no more than 1 tool insertion per 1.8 m of weld, and where a pre-test weld of nominally 2 m (at least 1.8 m and less than 2.2 m) is completed prior to the main wear measurement if there is any evidence of significantly accelerated wear initially, to remove the surface layer of the tool.

In FSW, the primary drivers are weld quality and tool life. These are directly linked in that running condition in which the workpiece zone around the tool (the weld zone) gets too hot causes excessive chemical wear of the tool and hot tearing in the weld zone, resulting in a poor weld. Conversely running with a weld zone too cold results in poor plasticity, with high forces on the tool, potentially causing fracture and voiding in the weld. Furthermore, slowing the traverse rate down may reduce the lateral forces on the tool, but they do not reduce the wear rate significantly since rotational drag dominates, and instead will increase the dwell time in the workpiece which will increase chemical wear. Consequently, the conditions for optimum weld are essentially the same as those for minimum tool wear. The above welding parameters give a good starting point for setting up the weld, however they may need varying to optimise the weld process and minimise the wear rate (per metre) on the tool.

The wear rate of interest is then the minimum wear rate achieved ($WR_M$) using either the precise conditions given above, or ones optimised from them which provide a good quality weld free from voiding and hot tearing. The material of this invention has an average wear rate ratio less than 1.0 μm/(m·mm), and preferably less than 0.5, 0.2, 0.1, 0.05 μm/(m·mm)

Prior Art and Testing Tools for 6 mm Welds

The majority of prior art publications report testing of tools suitable for 6 mm welds, and shows substantial wear on tools after 30 m, to the extent that the major features of the spiral on the tool are completely lost at the base of the pin. From images of these tools it is possible to make an estimate of the total material lost within the circle of diameter of the pin length, and from this calculate an approximate wear rate for comparison, values for a 6 mm tool being a wear rate of >20 um/m, giving a wear rate ratio of >3. In contrast, tool inserts of this invention have shown wear rates around 0.05.

Scaling Between Tool Sizes

Performance testing is most conveniently completed on tools designed for 6 mm welds, but it is important to understand that the results can be scaled to other tool sizes. Scaling is based primarily on empirical observation, although it can be supported in some areas by applying an analytical approach. Computational modelling is also under development for FSW processes but is generally not yet sufficient to predict all aspects of the weld. Thus, ultimately empirical observation is the most important contributor to models at this time. It is also generally found that the mechanical design or shape of the tool insert can simply be scaled from the design of a 6 mm tool in order to achieve similar results. Thus, a single design and knowledge of the size of a specific defined feature is sufficient. For convenience, this feature is taken as the pin length L; in practice it also acts as a general scale length.

Thus the key variables in FSW are (standard SI units are assumed throughout):

L=Pin length (m)
v=Traverse velocity (m/s)
ω=Rotation rate of tool

Three forces are applied to drive this behaviour:

$F_A$=Axial load (N)
$F_T$=Traverse force (N)
$F_R$=rotational force (N·m)

Work done on the workpiece, causing heating, arises primarily from the rotational force and is given by $F_R \cdot \omega$. In principle, additional heating results from $F_T \cdot v$, but this is generally much smaller, and no work is done by the axial force $F_A$ since all movement is normal to this force.

The Parametric Model

A standard set of test parameters for a 6 mm tool are:
$D_W$=6 mm $$L = 0.95\, D_W \quad (1)$$

L=Pin length (m)=0.0057 m (5.7 mm)
v=Traverse velocity (m/s)=0.005 m/s (0.3 m/min)
ω=Rotation rate of tool=200 rpm And the forces to achieve this are typically:

$F_A$=Axial load (N)=3800 N (3.8 kN)
$F_T$=Traverse force (N)=1000 N (1 kN)
$F_R$=rotational force (N·m)=to be confirmed Typically, the traverse rate scales inversely with L, such that:

$$L \cdot v = \text{constant} = 2.85 * 10^{-5}\ m^2/s. \quad (2)$$

Thus, if L is doubled for an application where DW=12 mm then typically the traverse rate will halve to 0.0025 m/s.

Typically the tool rotation rate ω varies approximately as:

$$\omega = \omega_6 \cdot L/L_6\char`\^(1/3) \quad (3)$$

Where the subscript 6 refers to the value of the parameter for a 6 mm weld depth.

The forces also scale, approximately according to L^(3/2).

These relationships enable those skilled in the art to suitably configure initial test parameters for tool sizes in the range 2 mm-30 mm, and from these initial values optimise the test for low wear rate of the tool insert.

Ultimately, there is no benefit to having a minimum wear rate, and whilst a wear rate of zero would be unphysical, there is no obvious way to predict what the minimum wear rate might be. For practical purposes, there is a practical threshold to what can be measured, which is if that the test is limited to 30 m and the measurement of average wear is limited to 5 μm, then the practical lower limit to the measured wear rate is 0.17 μm/m of weld. Thus in some embodiments there is a preferred lower limit of 0.17 μm/m of wear.

Those skilled in the art will be able to determine the wear rate and plunge life of any given FSW tool using the procedures given herein.

Grain Sharpness Measurement

The following steps were followed:

Convert the images into 8 bit grey scale

Using a threshold technique, identify the cBN grains within a 0-255 grey scale

Binarize the image

Using the Watershed image processing technique, separate the grains

Calculate the area of the grains and also the perimeter using software

Determine the circularity i.e. sharpness of the grain using the following expression:

$$\text{Circularity} = 4\pi \frac{\text{Area}}{(\text{Perimeter})^2}$$

Measuring Maximum Excursion

Using optical 3D surface measurements taken at magnification 5× on the Alicona InfiniteFocuus G5, line profiles were taken in key regions of interest, such as the tip and the flat segments on the spiral, to analyse the maximum excursion. A single, straight line profile was taken perpendicular to the texture across the maximum dimension of the textured feature, and averaged over 5 pixels. Doing this gives a plot of height with position, from which the difference between the maximum and minimum height is measured and quoted as excursion. This is repeated three times to ensure repeatability.

If the texture appears to be a square=like mesh, then the same measurements are repeated perpendicular to the previous ones.

Measuring Lateral Repeat

To measure the lateral repetition on the spiral, an optical 3D surface measurements was taken, again at magnification 5× on the Alicona InfiniteFocuus G5. A straight line profile was then taken, again 5 pixels thick, which spans the three lateral features. Looking at the height profile of the boundary between repeats is measured as an absolute distance, combining the horizontal and vertical components.

While this invention has been particularly shown and described with reference to embodiments, it will be understood by those skilled in the art that various changes in form and detail may be made without departing from the scope of the invention as defined by the appended claims.

The invention claimed is:

1. A friction stir welding tool insert comprising a polycrystalline cubic boron nitride, PCBN, composite material with a textured surface layer, as determined by optical microscopy or scanning electron microscopy, characterised in that the textured surface layer has a depth of between 0.5 and 50 µm, and wherein the textured surface layer comprises a pre-defined repeating pattern, wherein the PCBN composite material comprises cBN particles dispersed in a matrix material comprising a tungsten-rhenium matrix.

2. The tool insert as claimed in claim 1, in which the tool insert comprises a stirring pin and a shoulder, the stirring pin extending from a rounded apex to the shoulder.

3. The tool insert as claimed in claim 1, in which the textured surface layer comprises a plurality of surface features selected from any one of the following: truncated pyramids, cuboids, crevices, ridges, grooves.

4. The tool insert as claimed in claim 3, in which the plurality of surface features show a characteristic repeat distance locally.

5. The tool insert as claimed in claim 3, in which the plurality of surface features are uniform in size.

6. The tool insert as claimed in claim 1, in which the textured surface layer is homogeneous with a core of the tool insert.

7. The tool insert as claimed in claim 1, in which coverage of the textured surface layer extends across an entire surface of the tool insert.

8. The tool insert as claimed in claim 1, in which the textured surface layer is provided only in pre-determined zones on the tool insert.

9. The tool insert as claimed in claim 8, in which the textured surface layer is provided on a working face of the tool insert.

10. The tool insert as claimed in claim 8, in which the textured surface layer is provided in a region where the stirring pin merges with the shoulder.

11. The tool insert as claimed in claim 8, in which the textured surface layer is provided in a region extending between a first bound located radially at a third of a radius of the shoulder and a second bound located radially at two thirds of the radius of the shoulder.

12. The tool insert as claimed in claim 11, in which the textured surface layer extends at least partially across the surface between the first and second bounds.

13. The tool insert as claimed in claim 11, in which the textured surface layer extends across the whole of the surface between the first and second bounds.

14. The tool insert as claimed in claim 1, the textured surface layer having a surface roughness, Sa, of 0.5 to 5 µm.

15. The tool insert as claimed in claim 14, the textured surface layer having a surface roughness, Sa, of 1 to 2 µm.

16. The tool insert as claimed in claim 1, in which the PCBN composite material comprises an aluminium compound at least partially coating the cBN particles within the matrix material.

* * * * *